US012812073B2

(12) United States Patent
Jhaveri et al.

(10) Patent No.: US 12,812,073 B2
(45) Date of Patent: Nov. 24, 2026

(54) DISPLAY SYSTEM WITH LIGHT MODULATOR

(71) Applicant: TEXAS INSTRUMENTS INCORPORATED, Dallas, TX (US)

(72) Inventors: Harsh D. Jhaveri, Wylie, TX (US); Brenda Mcwilliams, Wylie, TX (US); Natalia Garcia, Carrollton, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 186 days.

(21) Appl. No.: 18/634,787

(22) Filed: Apr. 12, 2024

(65) Prior Publication Data

US 2024/0348753 A1 Oct. 17, 2024

Related U.S. Application Data

(60) Provisional application No. 63/495,816, filed on Apr. 13, 2023.

(51) Int. Cl.
*H04N 9/31* (2006.01)

(52) U.S. Cl.
CPC ........... *H04N 9/312* (2013.01); *H04N 9/3179* (2013.01); *H04N 9/3111* (2013.01); *H04N 9/3173* (2013.01)

(58) Field of Classification Search
CPC .... H04N 9/3111; H04N 9/312; H04N 9/3173; H04N 9/3179; G06F 1/325
See application file for complete search history.

(56) References Cited

U.S. PATENT DOCUMENTS

| | | | | |
|---|---|---|---|---|
| 10,067,728 B2 * | 9/2018 | Radhakrishnan | G06F 3/1423 | |
| 10,643,525 B2 * | 5/2020 | Sinha | G06F 1/3206 | |
| 2015/0009200 A1 * | 1/2015 | Moon | G09G 3/3233 | 345/82 |

* cited by examiner

*Primary Examiner* — Terrell S Johnson
(74) *Attorney, Agent, or Firm* — Michael T. Gabrik; Charles F. Koch

(57) ABSTRACT

A controller includes: a processor; and interface circuitry for multiple interfaces. The interface circuitry is coupled to the processor and is configured to: receive load sequences from the processor, the load sequences including a respective load sequence for each of the multiple interfaces, each load sequence including image data intervals and idle intervals; determine a duration for each of the idle intervals; and separately control a sleep mode for each of the multiple interfaces responsive to each of the idle intervals.

17 Claims, 20 Drawing Sheets

DISPLAY SYSTEM WITH LIGHT MODULATOR

CROSS REFERENCE TO RELATED APPLICATION

The present application claims priority to U.S. Provisional Application No. 63/495,816, titled "POWER REDUCTION FOR DMD TO ENABLE ULTRA LOW POWER APPLICATION IN THE SAME PROCESS TECHNOLOGY", filed on Apr. 13, 2023, which Application is hereby incorporated by reference in its entirety.

BACKGROUND

In some spatial light modulator systems, it is desirable to reduce power consumption. Lower power consumption is especially desirable for battery powered devices, such as augmented reality (AR) headsets.

SUMMARY

In an example, a controller includes: a processor; and interface circuitry for multiple interfaces. The interface circuitry is coupled to the processor and is configured to: receive load sequences from the processor, the load sequences including a respective load sequence for each of the multiple interfaces, each load sequence including image data intervals and idle intervals; determine a duration for each of the idle intervals; and separately control a sleep mode for each of the multiple interfaces responsive to each of the idle intervals.

In another example, a projector includes: a light modulator having first speed interface circuitry and second speed interface circuitry, wherein the first speed is higher than the second speed; and a controller having first speed interface circuitry and second speed interface circuitry. The first speed interface circuitry of the light modulator is coupled to the first speed interface circuitry of the controller to provide multiple first speed interfaces. The second speed interface circuitry of the light modulator is coupled to the second speed interface circuitry of the controller to provide a second speed interface. The controller is configured to: obtain a control sequence for the light modulator, the control sequence including control operation intervals and idle intervals; and gate a clock for the second speed interface during idle intervals of the control sequence.

In yet another example, a light modulator includes: a communication interface; adjustable control circuitry coupled to the communication interface; and an array of pixels coupled to the adjustable control circuitry. The adjustable control circuitry is configured to selectively adjust voltage levels for the array of pixels based on a target power consumption setting.

DETAILED DESCRIPTION

Figure 1A:
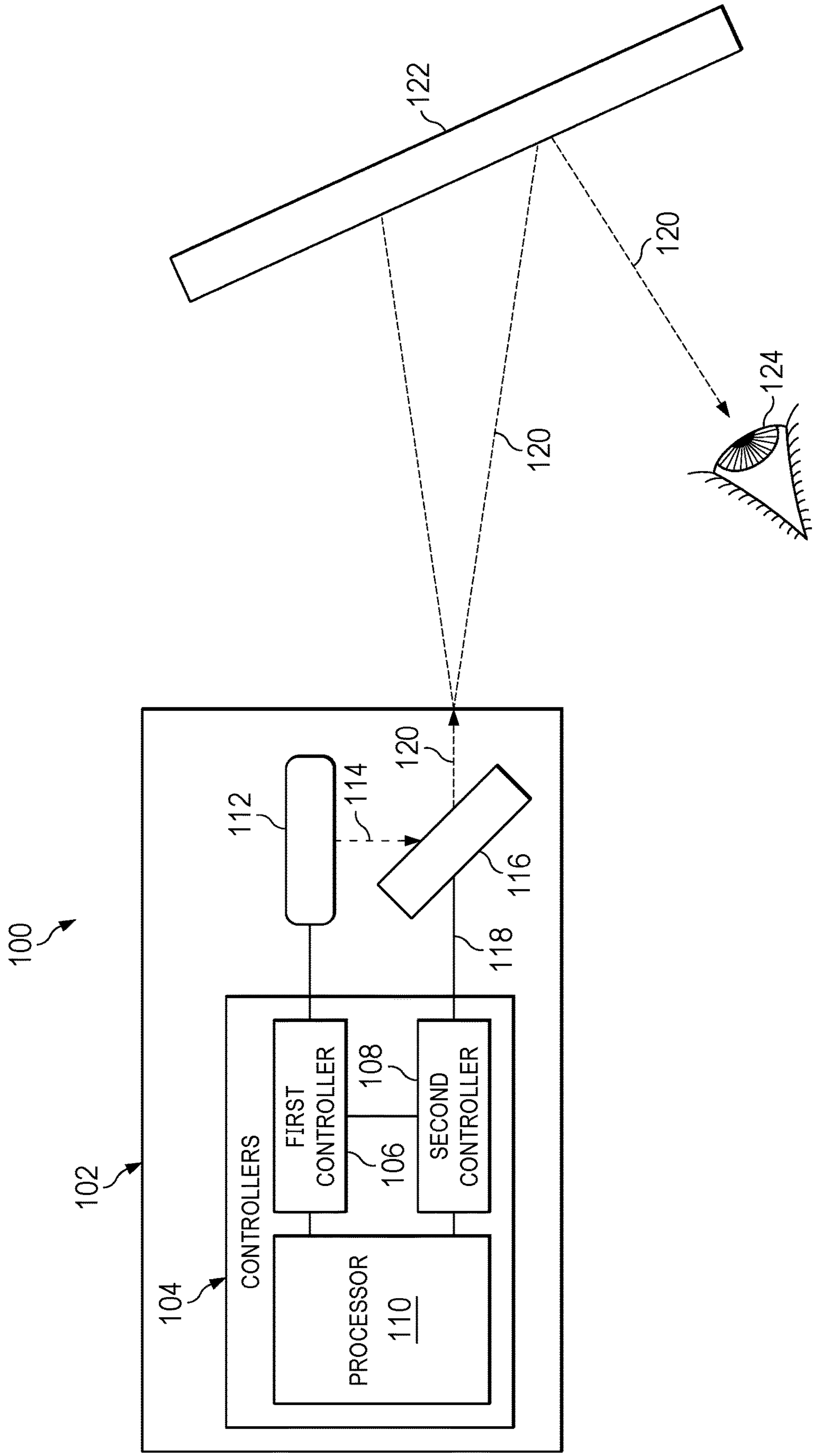
FIG. 1A is a diagram of a display system in accordance with various examples.

The same reference numbers or other reference designators are used in the drawings to designate the same or similar features. Such features may be the same or similar either by function and/or structure.

Described herein are different power reduction techniques for a light modulator and related display systems. The different power reduction techniques may be used individually or in combination. An example display system includes a light source, a controller, a light modulator, clock interfaces between the controller and the light modulator, and data interfaces between the controller and the light modulator. In some examples, the clock interfaces include higher speed clock interfaces and lower speed clock interfaces. Similarly, in some examples, the data interfaces include higher speed data interfaces and lower speed clock interfaces. Example power reduction techniques include: multi-tier (nested) sleep modes for each higher speed data interface and related components of a controller and light modulator; selective clock gating for each lower speed data interface and related components of a controller and light modulator; adjustable or optimized voltage regulation circuitry of a light modulator; and/or adjustable or optimized current regulation circuitry of a light modulator.

In some examples, there are 3 or more levels of nested sleep modes available for each higher speed data interface. In some examples, each higher speed data interface may use a different nested sleep mode level depending on different idle time durations for each respective higher speed data interface. In some examples, voltages and/or currents of a light modulator that may be adjustable or optimized include: a mirror bias reset (MBRST) voltage and related voltage levels; an internal power supply voltage (VMIDN); a block stepped address (BSA) voltage and related voltage levels; a wordline voltage; and/or a bitline voltage. As used herein, the MBRST voltage is a reset voltage applied to pixel element control circuitry (e.g., part of a pixel array element). As used herein, VMIDN is a supply voltage used to power control circuitry of a light modulator (e.g., the adjustable reset control circuitry 312 in FIG. 3). As used herein, the BSA voltage is a supply voltage used to power control circuitry (e.g., the control circuitry 405 herein) of a pixel array element. As used herein, a wordline voltage refers to the row write voltage for a pixel array element. As used herein, a bitline voltage refers to the column write voltage for a pixel array element. For example, the wordline and bitline voltages may be used to write a 1 or 0 to a memory cell if the row is enabled.

In some examples, a light modulator may provide control signals to adjust voltage regulation circuitry and/or current regulation circuitry responsive to a test, where the test indicates minimum voltage levels and/or minimum current levels needed to support functionality of the light modulator. In other examples, fabrication of a light modulator may be updated based on test results. In such examples, optimized voltage regulation circuitry and/or current regulation circuitry may be used in a light modulator. With adjustable voltage regulation circuitry and/or current regulation circuitry, there is more complexity and greater flexibility to make changes to each light modulator on-the-fly. With optimized voltage regulation circuitry and/or current regulation circuitry, the cost and size of each light modulator is optimized based on test results. In some examples, testing involves a test interface and control signals to adjusts the power levels provided by adjustable voltage regulation circuitry and/or current regulation circuitry. As another option, testing may involve modification of metal-only layers to selectively disable some of the available voltage regulation circuitry and/or current regulation circuitry to determine minimum voltage levels and/or minimum current levels. Based on test results, adjustments and/or fabrication optimization may be performed.

FIG. 1A is a diagram of a display system 100, in accordance with various examples. The display system 100 is a projection-based display that projects images or video for display. As shown in FIG. 1A, the display system 100 includes a display device 102 which is configured to project a modulated light 120 onto an image projection surface 122 for displaying the images or video. For example, the image projection surface 122 can be a wall or a wall mounted screen. In other examples, the image projection surface 122 may be a screen of a heads up display (HUD), a projection surface in a vehicle such as a windshield, an outdoor environment such as a road, an augmented reality (AR) or virtual reality (VR) combiner, a three-dimensional (3D) display screen, or other display surfaces for projection-based display systems. In examples, the display system 100 is a portable projector or a wearable AR/VR device that can be powered by a battery with a limited power supply. In other examples, the display system 100 may be part of a light control application such as photolithography or 3D printing.

The modulated light 120 may be modulated by a light modulator 116 in the display device 102 to project images, such as video frames, onto the image projection surface 122. The light modulator 116 can be a microelectromechanical system (MEMS) based spatial light modulator (SLM), such as a digital mirror device (DMD), or a liquid crystal-based SLM, such as a liquid crystal display (LCD) or liquid crystal on silicon (LCoS) device. The light modulator 116 modulates the intensity of the projected light based on optical elements that are controlled to manipulate the light and accordingly form the pixels of a displayed image. In examples, the light modulator 116 is a DMD, where the optical elements are adjustable tilting micromirrors that are tilted by applying voltages to the micromirrors through respective electrodes. The micromirrors are tilted to project dark pixels or bright pixels with color shades. In other examples, the light modulator 116 is an LCD or an LCoS device, where the optical elements are liquid crystals that are controlled by voltage to modulate the intensity of light across the image pixels. The intensity of light is modulated by applying voltage to the liquid crystals, which reorients the crystals, also referred to herein as switching the crystals, and accordingly controls the amount of light projected per pixel. The optical elements can be a transmissive array of liquid crystal cells such as in an LCD, or a reflective array of liquid crystal cells such as in an LCoS device. The cells of liquid crystals can be controlled by voltages, through respective electrodes, to modulate light.

In other examples, the light modulator 116 can be a phase light modulator (PLM) or a ferroelectric liquid crystal on silicon (FLCoS) device. A PLM can be a MEMS device including micromirrors that have adjustable heights with respect to the PLM surface. The heights of the micromirrors can be adjusted by applying voltages. The micromirrors may be controlled with different voltages to form a diffraction surface on the PLM. For example, each micromirror can be coupled to respective electrodes for applying a voltage and controlling the micromirror independently from the other micromirrors of the PLM. The diffraction surface is a phase altering reflective surface to light incident on the surface of the light modulator 116 from a light source. The phase altering reflective surface represents a hologram for projecting illumination patterns of light that form an image on an image projection surface. The hologram is formed as a diffraction surface by adjusting the heights of the micromirrors of the PLM. The hologram is formed based on an image that is to be displayed by projecting the light on the image projection surface 122. An FLCoS device includes ferroelectric liquid crystals (FLCs) that have a faster voltage response than other liquid crystal devices (e.g., LCDs and LCoS devices) and accordingly can project images at a higher rate. Other examples of the light modulator 116 include micro-light emitting diodes (micro-LEDs) and micro-organic light emitting diodes (micro-OLEDs).

The modulated light 120 can be formed as a combination of color modes (e.g., blue, green, and red) from an incident light 114, which is generated by one or more light sources 112. For example, three color modes can provide three basic color components for displaying an image in full color. The color modes in the incident light 114 can be transmitted concurrently or by time multiplexing the light sources 112. The incident light 114 with the different color modes is modulated by the light modulator 116 in the display device 102 to produce the modulated light 120 for displaying images or video on the image projection surface 122.

The display device 102 also includes one or more controllers 104 configured to control the light modulator 116 and the light sources 112 to display the images or video. For example, the controllers 104 can include a first controller 106 for controlling the light sources 112 to transmit the incident light 114 concurrently or consecutively by time multiplexing. In some examples, the controllers 104 may be a single controller. The controllers 104 can also include a second controller 108 for controlling the light modulator 116 to modulate the incident light 114 from the respective light sources 112. In other examples, the display device 102 can include multiple light modulators 116 that each forms a respective modulated light 120. For example, each light modulator 116 can be optically coupled to respective light sources 112 and have respective controllers 104. The display device 102 also includes a processor 110 configured to process an image and produce a processed image for projection. The processed image can be a digital image, which is useful to provide control signals from the one or more controllers 104 to the light modulator 116 and the light sources 112. For example, the second controller 108 receives sequences of image data to be displayed from the processor 110. The sequences of image data can represent an image frame or a sequence of respective image frames to be displayed. The one or more controllers 104 produce display image data based on the sequences of image data, and transmit the display image data to the light modulator 116 on an interface 118. The one or more controllers 104 can provide control signals to the light modulator 116 based on the display image data. The light modulator 116 modulates the incident light 114 according to the control signals to display an image or a sequence of image frames, such as in a video, represented by the display image data. The light modulator 116 is configured to project the modulated light 120 on the image projection surface 122 to display the images for viewing by a human eye 124, also referred to herein as the human visual system (HVS) pupil. The display device 102 can further include one or more input/output devices (not shown), such as an audio input/output device, a key input device, a display, and the like. For example, the display device 102 is a wearable AR/VR device and the image projection surface 122 is an AR/VR combiner. The AR/VR device can include two AR/VR combiners for right and left eye viewing, respectively. Other examples of the display device 102 include displays such as LCDs, OLEDs, active-matrix OLEDs (AMOLEDs), for smartphones, tablets, laptops, and other portable devices.

In some examples, the first controller 106 and the second controller 108 may be different controllers. The first controller 106 may be a digital controller configured to switch the light sources 112 on and off. In other examples, the first controller 106 may be an analog controller that changes the level of light intensity of the incident light 114 from the light sources 112. In some examples, an analog controller may transmit pulse width modulation (PWM) signals to the light modulator 116 to synchronize the adjustment of the optical elements in the light modulator 116 with the transmission of the incident light 114 from the light sources 112. The second controller 108 may be an analog or a digital controller that switches states of the optical elements of the light modulator 116. For example, the second controller 108 may be an analog controller or a digital controller that switches the angles of micromirrors of an SLM or the heights of micromirrors of a PLM.

In some examples, the second controller 108 is a digital controller coupled to a static random access memory (SRAM) (not shown) including an array of memory cells each configured to store voltage values, such as in bits, to adjust respective micromirrors of an SLM or a PLM. The micromirrors can be adjusted according to the bit values in the corresponding SRAM cells, such as based on PWM signals from the first controller 106. In other examples, the light modulator 116 is an LCD, an LCoS device, or a FLCoS device and the optical elements are liquid crystals that are controlled by the second controller 108 to modulate the incident light 114 across the image pixels.

In some examples, the display system 100 may use one or more power reduction techniques to reduce power consumption. In some examples, a first set of power reduction techniques are used during normal operations of the display system 100 and a second set of power reduction techniques are used during a low power mode of the display system 100. Without limitation, example power reduction techniques may include: multi-tier (nested) sleep modes for each higher speed data interface (see e.g., interfaces for DMD_HS_SD0_PIN to DMD_HS_SDn_PIN in FIG. 2A) of the controllers 104; selective clock gating for each lower speed data interface (see e.g., interfaces for DMD_LS_DAT A0 to DMD_LS_DAT An in FIG. 2A) of the controllers 104; adjustable voltage regulation circuitry (see e.g., the adjustable bitline drivers 306 in FIG. 3, the adjustable wordline drivers 314 in FIG. 3, the adjustable reset control circuitry 312 in FIG. 3, the bitline driver power control 1400, or the wordline driver circuitry 1420 in FIG. 14B) and related power consumption optimization operations of the light modulator 116; and/or adjustable current regulation circuitry (see e.g., the VMIDN generators 328A to 328N in FIG. 3, or the voltage regulation circuit 600 in FIG. 6) and related power consumption optimization operations of the light modulator 116.

In some examples, there are 3 or more levels of nested sleep modes available for each higher speed data interface of the controllers 104. In some examples, each higher speed data interface of the controllers 104 may use a different nested sleep mode level depending on different idle time durations for each respective higher speed data interface. In some examples, control voltages and/or control currents of the light modulator 116 that may be adjustable include: an MBRST voltage and related voltage levels; a BSA voltage and related voltage levels; a wordline voltage; and/or a bitline voltage.

In some examples, the one or more controllers 104 are configured to process the sequences of image data received from the processor 110 to determine whether to power down the display device 102 from the normal operation mode to multiple nested sleep modes that are ordered from higher to lower power usage. The one or more controllers 104, such as the second controller 108, can analyze the pattern of the sequences of image data to identify when the display device 102 enters each of the determined nested sleep modes. For example, the controllers 104 can enter or instruct the components of the display device 102 to enter, based on a gap length in the sequence of image data, sleep modes according to an order from higher to lower power usage. Controllers 104 can determine according to the length of one or more gaps in a sequence of image data a timing to enter and exit each nested sleep mode. In some examples, the timing of each nested sleep mode is determined by the controllers 104 to reduce power usage during idle periods of the components of the display device 102. Such components may be part of the interface 118, the light modulator 116, or the one or more controllers 104. If longer idle periods or longer gaps in the data are expected, the display device 102 can enter more nested sleep modes to further reduce power usage. For each of the sleep modes, respective components and/or functions are switched off or disabled to provide a respective level of reduced power usage.

In some examples, the processor 110 is configured to add extended sleep mode signals in the image data received by the controllers 104. The extended sleep mode signals in the image data indicate inactive display periods during the transmission of the display image data, which allow the components of the display device 102 to power down. In some examples, the controllers 104 detect the extended sleep mode signals and accordingly instructs the components of the display device 102 to enter one or more extended sleep modes. The extended sleep modes have lower power usage in comparison to other nested sleep modes.

In some examples, the display system 100 can be switched from a normal operation mode to a power saving mode to reduce power usage when the display system 100 is idle. For example, the display system 100 can power down from a normal operation mode, during an inactive operation period, by entering a powered down operation mode to reduce power usage. For portable or wearable display systems that operate on battery power, such as portable projectors or AR/VR devices, reducing power usage is also useful to extend the battery lifetime.

In some examples, the display system 100 includes a light modulator 116. In different examples, the light modulator 116 may be an SLM (e.g., a DMD, an LCD, a liquid crystal on silicon (LCoS), etc.), a phase light modulator (PLM), or a liquid crystal based light modulator. The light modulator 116 is controlled by a controller through an interface 118 for transmitting display image data. For example, the controllers 104 transmit the display image data on the interface 118 to the light modulator 116 based on low-voltage differential signaling (LVDS). During an inactive transmission period of display image data, such as when the display system 100 does not project images, the interface between the controllers 104 and the light modulator 116 can be powered down from a normal operation level to reduce power usage. When the display system 100 projects images, the interface 118 is maintained powered up at the normal operation level during an active transmission period of the display image data between the controllers 104 and the light modulator 116. Maintaining the interface 118 powered up includes enabling the circuit blocks, clocks and/or buffers on both ends of the interface 118. Because the transmitted display image data can include gaps during the active transmission period, system functions can be idle during a portion of this time. Accordingly, maintaining the interface 118 powered up at the normal operation level during the entire transmission period may not be needed and wastes system power.

In some examples, the display system 100 reduces power consumption by switching components of the controllers 104 and/or the light modulator 116 from a normal operation mode to different nested sleep modes in a certain order. The different nested sleep modes may switch off different components and/or functions of the display system 100 to reduce power usage to different levels in comparison to the normal operation mode. In some examples, the display system 100 powers down enters respective sleep modes ordered from higher to lower power usage. In some examples, the nested sleep modes power down transmitter components and/or receiver components related to the interface 118.

The number of nested sleep modes and the respective reduced levels of power usage can be determined based on the pattern, including gaps, of received image data. For example, if the display image data produced based on the received image data includes a gap during an active transmission period, system functions may be idle during the gap time. During this idle time, the display system can be powered down by entering one or more sleep modes, in the order from higher to lower power usage, which reduce power usage in comparison to a normal operation mode. The system can then be powered up by exiting the nested sleep modes in the reverse order, from lower to higher power usage, until reaching the normal operation mode in time for transmitting a next data portion. Entering the nested sleep modes saves power in the system during an active transmission period of display image data. Entering and then exiting the nested sleep modes according to this order, also referred to herein as cycling through the nested sleep modes, allows timing the powering down and powering up of the system according to the traffic pattern in the received image data. For example, cycling through the nested sleep modes allows powering down components of the system during gaps in the traffic, and powering up the components in time to handle incoming data in the traffic. Entering and exiting the nested sleep modes also accounts for the duration of powering down and powering up, respectively, each of the nested sleep modes.

In some examples, the controllers 104 obtain a next sequence of image data to be transmitted to the light modulator 116, such as a next portion of an image frame to be displayed. For example, an image frame can include a number of sequences of image data. In other examples, a sequence of image data represents an image frame, and a number of sequences of image data represent a number of image frames, such as in a video. The controllers 104 determine, based on the sequence of image data, the number of sleep modes with reduced power usage in idle time during the transmission of display image data. The idle time can include periods of inactive image data write activity to a buffer, periods of inactive image data read activity from a buffer, or periods of gaps in the display image data. The sequence of image data received from the processor can also include extended sleep mode signals identifying extended inactive periods that allow the system to enter extended sleep modes to further reduce power usage within the nested sleep modes.

Figure 1B:
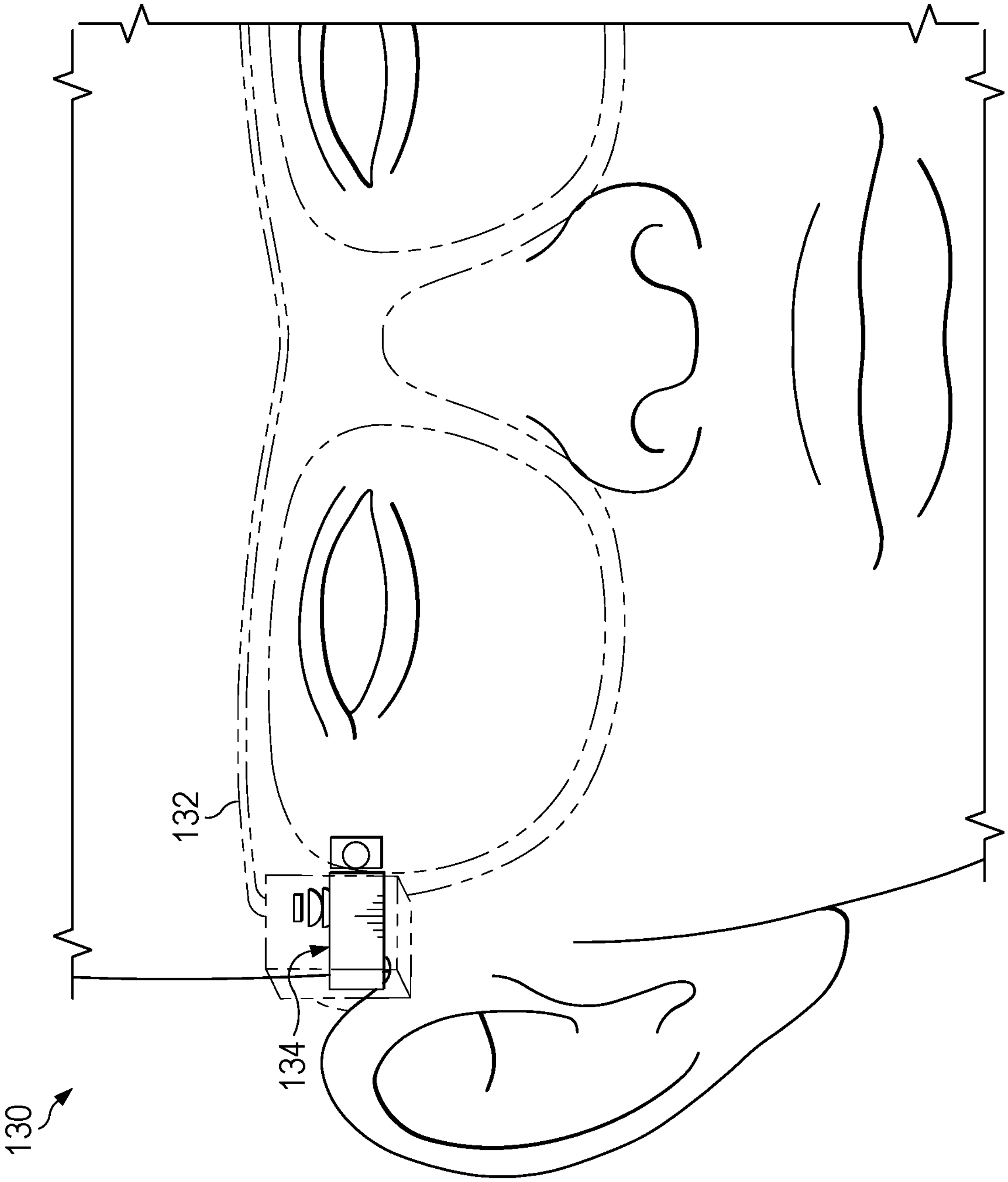
FIG. 1B is a diagram of a near-eye display system in accordance with various examples.

FIG. 1B is a diagram of a near-eye display system 130. The near-eye display system 130 includes frames 132 and an optical engine 134 near the temples of the frames 132. In some examples, the optical engine 134 is an example of the display device 102 in FIG. 1. In some examples, the optical engine 134 may be compact, low in power consumption, and light in weight. While one optical engine 134 is pictured in FIG. 1B, the near-eye display system 130 may contain two optical engines, one on each temple for each eye.

Figure 1C:
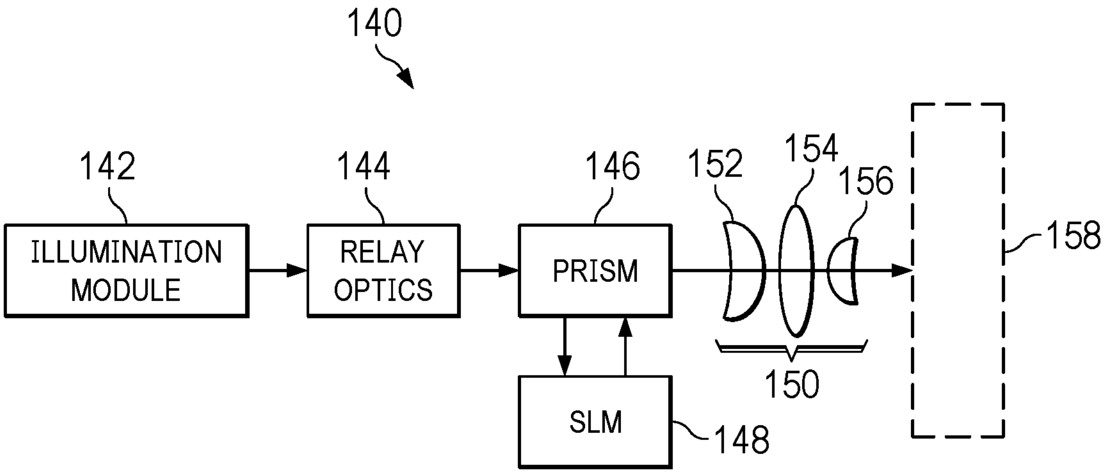
FIGS. 1C and 1D are diagrams of optical engines in accordance with various examples.

FIG. 1C is a diagram of an optical engine 140 in accordance with various examples. The optical engine 140 includes an illumination module 142, relay optics 144, prism 146, SLM 148, projection optics 150, and waveguide 158. In some examples, the illumination module 142 is a compact illumination module configured to produce illumination light having a small pupil size. The illumination module 142 may be a one channel illumination module, a two channel illumination module, or a three channel illumination module. In one example, the illumination module 142 has one or more light emitting diodes (LEDs) coupled to a lens or lens array of the projection optics 150. The illumination module 142 may also contain a dichroic mirror and/or a dichroic wedge to combine light from multiple LEDs. In another example, the illumination module 142 contains an array of light sources, for example LEDs, coupled to at least one lens, where each light source illuminates a zone of the SLM 148.

The illumination module 142 is optically coupled to relay optics 144, and relay optics 144 is optically coupled to the prism 146. In some examples, the relay optics 144 is a single piece relay optics. In other examples, the relay optics 144 contains multiple components with or without air spaces. In an example, the relay optics 144 is composed of plastic or glass. The use of plastic for the relay optics 144 may reduce the cost and weight of the relay optics 144. The relay optics 144 may be at least partially arranged in space adjacent the prism 146, reducing the size of the optical engine 140. The relay optics 144 may have a first surface, a second surface, a third surface, and a fourth surface. The illumination light enters the relay optics 144 via the first surface. The second surface reflects the illumination light to produce first reflected light. The third surface reflects the reflected light using total internal reflect to produce second reflected light. The fourth surface reflects the second reflected light to produce third reflected light. The third surface then transmits the reflected light towards the prism 146 as transmitted light.

The prism 146 is optically coupled to the relay optics 144, to the SLM 148, and to projection optics 150. The prism 146 directs the transmitted light from the relay optics 144 towards the SLM 148. The SLM 148 may be a liquid crystal on silicon (LCoS) device, a liquid crystal display (LCD), a digital micromirror device (DMD), or another SLM device. The SLM 148 modulates the transmitted light to produce modulated light. The SLM 148 sets pixels to on or off values to produce an image based on incident light. The prism 146 directs the modulated light towards projection optics 150.

The projection optics 150 is optically coupled to a waveguide 158. In FIG. 1C, the projection optics 150 is illustrated having three lenses, lens 152, lens 154, and 156. However, in other examples, the projection optics 150 may have fewer or more lenses. For example, the projection optics 150 may contain a single freeform eyepiece. The projection optics 150 directs the modulated light towards the waveguide 158 as projection light. In some examples, the waveguide 158 directs the modulated light towards a user's eye (not pictured in FIG. 1C).

Figure 1D:
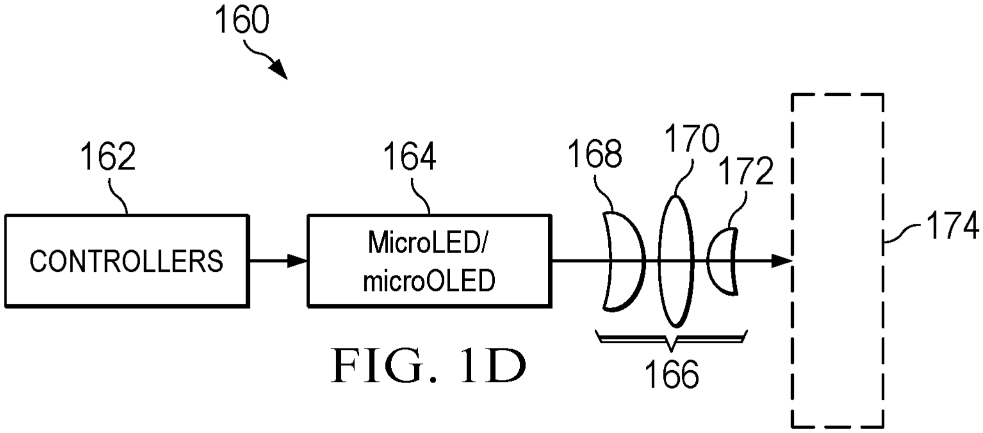

FIG. 1D is a diagram of another optical engine 160 in accordance with various examples. The optical engine 160 includes controllers 162, microLED or microOLED elements 164, projection optics 166, and waveguide 174. In some examples, the controllers 162 and microLED or microOLED elements 164 are configured to produce illumination light having a small pupil size. In some examples, the controllers 162 and the microLED or microOLED elements 164 provide one channel illumination, two channel illumination, or three channel illumination. The microLED or microOLED elements 164 are coupled to a lens or lens array of the projection optics 166.

The projection optics 166 is optically coupled to a waveguide 174. In FIG. 1D, the projection optics 166 is illustrated having three lenses, lens 168, lens 170, and lens 172. However, in other examples, the projection optics 166 may have fewer or more lenses. For example, the projection optics 166 may contain a single freeform eyepiece. The projection optics 166 direct the modulated light towards the waveguide 174 as projection light. In some examples, the waveguide 174 directs the modulated light towards a user's eye (not pictured in FIG. 1D).

Figure 2A:
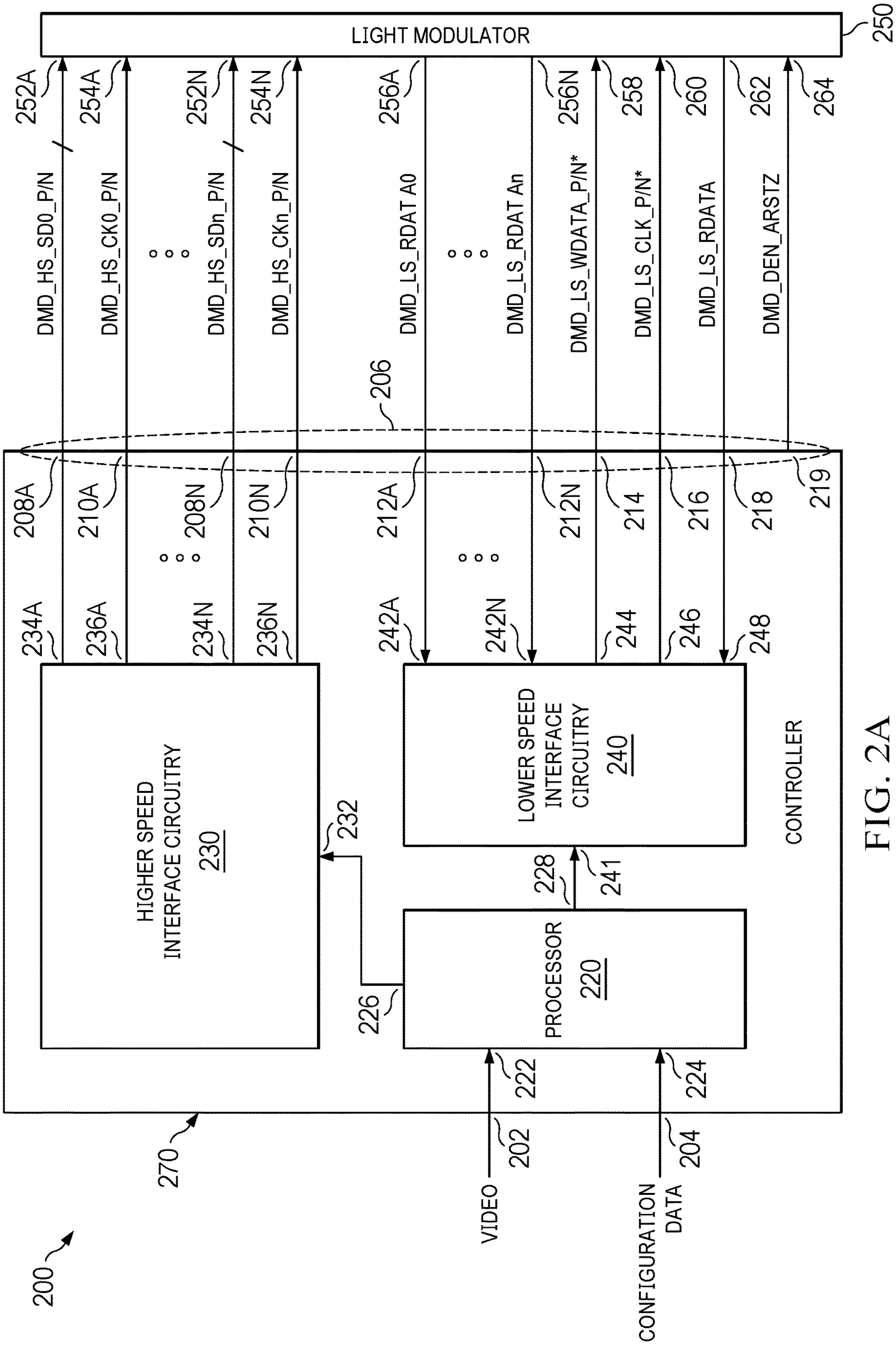
FIGS. 2A and 2B are diagrams of display system components in accordance with various examples.

FIG. 2A is a diagram of display system components 200 in accordance with various examples. In the example of FIG. 2A, the display system components 200 include a controller 270 and a light modulator 250. The controller 270 is an example of the controllers 104 in FIG. 1A. The light modulator 250 is an example of the light modulator 116 in FIG. 1A.

In the example of FIG. 2A, the controller 270 has a first terminal 202, a second terminal 204, and interface terminals 206. The interface terminals 206 include a set of third terminals 208A to 208N, a set of fourth terminals 210A to 210N, a set of fifth terminals 212A to 212N, a sixth terminal 214, a seventh terminal 216, an eighth terminal 218, and a ninth terminal 219. In some examples, the set of third terminals 208A to 208N includes higher speed data terminals, the set of fourth terminals 210A to 210N includes higher speed clock terminals, the set of fifth terminals 212A to 212N include lower speed data terminals, the sixth terminal 214 is a lower speed write data terminal, the seventh terminal 216 is a lower speed clock terminal, the eighth terminal 218 is a lower speed read data terminal, and the ninth terminal 219 is an enable terminal. As used herein, "higher speed" refers to 400 MHz to 720 MHz, while "lower speed" refers to 120 MHz or less.

In the example of FIG. 2A, the light modulator 250 has a set of first terminals 252A to 252N, a set of second terminals 254A to 254N, a set of third terminals 256A to 256N, a fourth terminal 258, a fifth terminal 260, a sixth terminal 262, and a seventh terminal 264. In some examples, the set of first terminals 252A to 252N include higher speed data terminals, the set of second terminals 254A to 254N include higher speed clock terminals, the set of third terminals 256A to 256N include lower speed data terminals the fourth terminal 258 is a lower speed write data terminal, the fifth terminal 260 is a lower speed clock terminal, the sixth terminal 262 is a lower speed read data terminal, and the seventh terminal 264 is an enable terminal.

In the example of FIG. 2A, the controller includes a processor 220, higher speed interface circuitry 230, and lower speed interface circuitry 240. The processor 220 has a first terminal 222, a second terminal 224, a third terminal 226, and a fourth terminal 228. The higher speed interface circuitry 230 has a first terminal 232, a set of second terminals 234A to 234N, and a set of third terminals 236A to 236N. In some examples, the set of second terminals 234A to 234N includes higher speed data terminals, and the set of third terminals 236A to 236N includes higher speed clock terminals. The lower speed interface circuitry 240 has a first terminal 241, a set of second terminals 242A to 242N, a third terminal 244, a fourth terminal 246, and a fifth terminal 248. In some examples, the set of second terminals 242A to 242N include lower speed data terminals, the third terminal 244 is a lower speed write data terminal, the fourth terminal 246 is a lower speed clock terminal, and the fifth terminal 248 is a lower speed read data terminal.

In the example of FIG. 2A, terminals of the set of third terminals 208A to 208N of the controller 270 are coupled to respective terminals of the set of first terminals 252A to 252N of the light modulator 250. Terminals of the set of fourth terminals 210A to 210N of the controller 270 are coupled to respective terminals of the set of second terminals 254A to 254N of the light modulator 250. Terminals of the set of fifth terminals 212A to 212N of the controller 270 are coupled to respective terminals of the set of third terminals 256A to 256N of the light modulator 250. The sixth terminal 214 of the controller 270 is coupled to the fourth terminal 258 of the light modulator 250. The seventh terminal 216 of the controller 270 is coupled to the fifth terminal 260 of the light modulator 250. The eighth terminal 218 of the controller 270 is coupled to the sixth terminal 262 of the light modulator 250. The ninth terminal 219 of the controller 270 is coupled to the seventh terminal 264 of the light modulator 250.

In the example of FIG. 2A, terminals of the set of third terminals 208A to 208N of the controller 270 are also coupled to respective terminals of the set of second terminals 234A to 234N of the higher speed interface circuitry 230. Terminals of the set of fourth terminals 210A to 210N of the controller 270 are also coupled to respective terminals of the set of third terminals 236A to 236N of the higher speed interface circuitry 230. Terminals of the set of fifth terminals 212A to 212N of the controller 270 are also coupled to respective terminals of the set of second terminals 242A to 242N of the lower speed interface circuitry 240. The sixth terminal 214 of the controller 270 is also coupled to the third terminal 244 of the lower speed interface circuitry 240. The seventh terminal 216 of the controller 270 is also coupled to the fourth terminal 246 of the lower speed interface circuitry 240. The eighth terminal 218 of the controller 270 is also coupled to the fifth terminal 248 of the lower speed interface circuitry 240. The first terminal 222 of the processor 220 is coupled to the first terminal 202 of the controller 270. The second terminal 224 of the processor 220 is coupled to the second terminal 204 of the controller 270. The third terminal 226 of the processor 220 is coupled to first terminal 232 of the higher speed interface circuitry 230. The fourth terminal 228 of the processor 220 is coupled to first terminal 241 of the lower speed interface circuitry 240.

In some examples, the controller 270 is configured to: receive video data at the first terminal 202; receive configuration data at the second terminal 204; use the processor and the higher speed interface circuitry 230 to prepare first data and first clock signals for the light modulator 250 responsive to the video data and the configuration data; provide the first data to the set of third terminals 208A to 208N; provide the first clock signals to the set of fourth terminals 210A to 210N; use the processor and the lower speed interface circuitry 240 to prepare second data and a second clock signal for the light modulator 250 responsive to the video data and the configuration data; provide the second data to the set of fifth terminals 212A to 212N; and provide the second clock signal to the seventh terminal 216. In some examples, the first data includes image/bitplane content. In some examples, the first clock signals include a reference clock for each interface to clock in the first data at the light modulator 250. In some examples, the second data includes confirmation information or commands. In some examples, the second clock signal is a reference clock to clock configuration information or commands at the light modulator 250.

In some examples, the controller 270 is also configured to: prepare write data for the light modulator responsive to sequence commands; provide the write data at the sixth terminal 214; receive read data at the eighth terminal 218; and process the read data using a state machine or other logic. In some examples, the write data includes commands to the light modulator 250, and the read data includes responses and/or data from the light modulator 250 responsive to the write data.

In some examples, the controller 270 and/or the light modulator 250 may use one or more power reduction techniques to reduce power consumption. In some examples, a first set of power reduction techniques are used during normal operations of the display system components 200 and a second set of power reduction techniques are used during a low power mode of the display system components 200. Without limitation, example power reduction techniques may include: nested sleep modes for each higher speed data interface (see e.g., interfaces for DMD_HS_SD0_PIN to DMD_HS_SDn_PIN in FIG. 2A) of the controller 270; selective clock gating for each lower speed data interface (see e.g., interfaces for DMD_LS_DAT A0 to DMD_LS_DAT An in FIG. 2A) of the controller 270; an adjustable voltage regulation circuit (see e.g., the adjustable bitline drivers 306 in FIG. 3, the adjustable wordline drivers 314 in FIG. 3, the bitline driver power control 1400, or the wordline driver circuitry 1420 in FIG. 14B) and related power consumption optimization operations of the light modulator 250; and/or adjustable current regulation circuitry (see e.g., VMIDN generators 328A to 328N in FIG. 3, or the voltage regulation circuit 600 in FIG. 6) and related power consumption optimization operations of the light modulator 250.

In some examples, there are 3 or more levels of nested sleep modes available for each higher speed data interface of the controller 270. In some examples, each higher speed data interface of the controller 270 may use a different nested sleep mode level depending on different idle time durations for each respective higher speed data interface. In some examples, control voltages and/or control currents of the light modulator 250 that may be adjustable include: an MBRST voltage and related voltage levels; BSA volage and related voltage levels; a wordline voltage; and/or a bitline voltage. In some examples, adjusting the control voltages and/or the control currents of the light modulator 250 involves a testing or optimization process to determine minimum control voltages and/or minimum control currents that maintain functionality of the light modulator 250. Once the testing or optimization process determines minimum control voltages, related control voltages of the light modulator 250 may be adjusted to be above (e.g., 5% above, 10% above, or another threshold) the minimum control voltages. Similarly, once the testing or optimization process determines minimum control currents, related control currents of the light modulator 250 may be adjusted to be above (e.g., 5% above, 10% above, or another threshold) the minimum control currents.

Figure 2B:
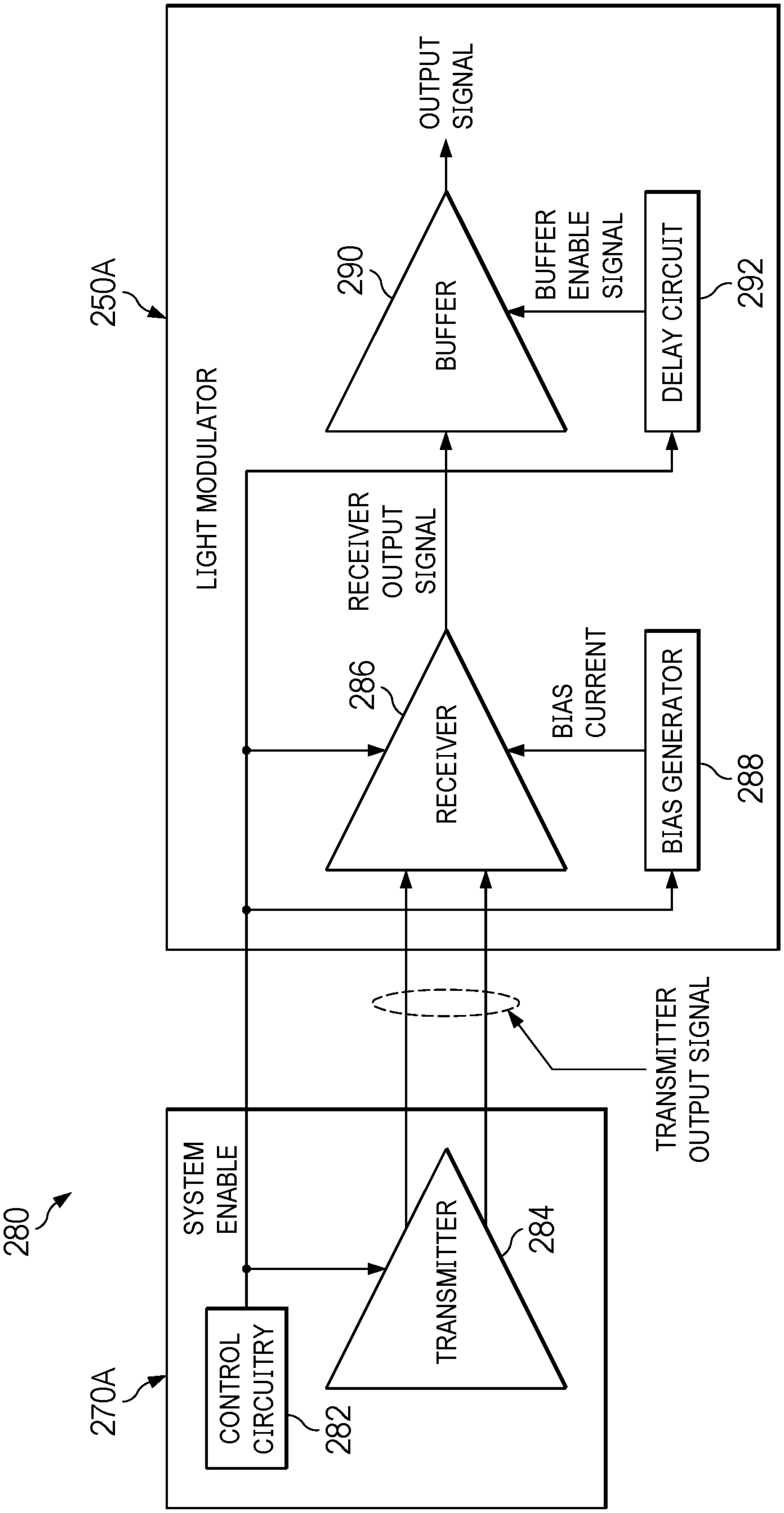

FIG. 2B is a diagram of display system components 280 in accordance with various examples. In the example of FIG. 2B, the display system components 280 include a controller 270A and a light modulator 250A. The controller 270A is an example of the controllers 104 in FIG. 1A, or the controller 270 in FIG. 2A. The light modulator 250A is an example of the light modulator 116 in FIG. 1A, or the light modulator 250 in FIG. 2A. In the example of FIG. 2B, the controller 270A includes control circuitry 282 coupled to a transmitter 284. The light modulator 250A includes a receiver 286, a bias generator 288, a buffer 290, and a delay circuit 292. The receiver is coupled to the transmitter 284 and to the control circuitry 282. The bias generator 288 is coupled to the receiver 286 and to the control circuitry 282. The buffer 290 is coupled to the receiver 286. The delay circuit 292 is coupled to the buffer 290 and to the control circuitry 282. In some examples, the light modulator 250A is an SLM for image projection and the controller 270A is for controlling the light modulator 250A. In different examples, the light modulator 250A may be a DMD, an LCoS device, an LCD device, a microLED device, or another SLM, such as a PLM or a FLCoS device.

In the examples of FIG. 2B, the control circuitry 282 is coupled to the transmitter 284, the receiver 286, the bias generator 288, the buffer 290, and the delay circuit 292. In some examples, the control circuitry 282 produces an enable signal. In some examples, the transmitter 284 has an enable input and a transmitter output. In some examples, the transmitter 284 transmits data and clock signals to the light modulator 250A. In some examples, the transmitter 284 transmits eight data streams and one clock stream to the receiver 286. In some examples, the transmitter 284 is a differential transmitter. The transmitter output of the transmitter 284 is coupled to a receiver input of the receiver 286. In some examples, the transmitter 284 receives an enable signal at the enable input from the control circuitry 282 (e.g., after waking from a deep sleep mode). In response to receiving the enable signal, the transmitter 284 begins transmitting a transmitter output signal at a transmitter output to the light modulator 250A. The transmitter output signal is received as a receiver input of the receiver 266. In some examples, the transmitter output signal includes one clock stream and eight data streams. In some examples, the transmitter output signal is a differential signal.

As shown, the light modulator 250A includes the receiver 286, which has a receiver input coupled to the transmitter output, an enable input coupled to the control circuitry 282 a receiver output, and a bias current input. The receiver input of the receiver 286 is configured to receive the transmitter output signal from the transmitter 284. In response to receiving the enable signal from the control circuitry 282 at the enable input, the receiver 286 powers up and begins receiving the transmitter output signal at the receiver input. The bias generator 288 has an enable input and a bias current output. The bias generator 288 is configured to: receive the enable signal from the control circuitry 282 at the enable input; and provide a bias current at the bias current output, which is coupled to the bias current input of the receiver 286. In some examples, the bias generator 288 has a single bias current output. In other examples, the bias generator 288 has multiple bias outputs, with each bias output coupled to a different receiver. In an example, the bias generator 288 has nine bias outputs which are respectively coupled to nine receivers. The nine receivers may include eight data receivers and one clock receiver. In response to receiving the enable signal at the enable input, the bias generator 288 rapidly ramps up the bias current to rapidly turn on the receiver 286. For example, the bias generator 288 rapidly ramps up a bias current at the bias current output, which is coupled to the bias current input of the receiver 286 by turning on a quick turn on circuit. The bias generator 288 brings the bias current to a stable level, stabilizing the receiver 286 as the receiver 286 approaches full operation. In some examples, the receiver 286 is configured to produce a receiver output signal at the receiver output based on receiving the transmitter output signal at the receiver input and based on receiving a bias current at the bias current input. The receiver 286 is configured to: receive the enable signal at the enable input; and turn on in response to receiving the enable signal. After the receiver 286 is turned on, the receiver 286 produces a receiver output signal at the receiver output based on the transmitter output signal. In some examples, the receiver 286 is a differential receiver which receives a differential transmitter output signal and produces a single ended receiver output signal. In some examples, the bias generator 288 ramps up the current more rapidly in response to receiving the enable signal enables the receiver 286 to power up more quickly, especially when returning from a low power state, without glitches.

The buffer 290 has a buffer input coupled to the receiver output of the receiver 286. The buffer 290 has an enable input coupled to the delay circuit 292, and a buffer output. The buffer input is configured to receive the receiver output signal from the receiver output of the receiver 286. The buffer output is coupled to the data path of the application. In an example in which the light modulator 250A is an SLM, the buffer output is coupled to pixels of the SLM. In some examples, the delay circuit 292 has a delay output coupled to the enable input of the buffer 290. The delay circuit 292 is configured to produce a buffer enable signal at the delay output. The buffer 290 is configured to: receive the receiver output signal at the buffer input; receive the buffer enable signal at the enable input; and produce an output signal at the buffer output responsive to the o receiver output signal and the buffer enable signal. The buffer 290 is enabled based on receiving the buffer enable signal at the enable input. When enabled, the buffer 290 produces an output signal at the buffer output based on receiving the receiver output signal at the buffer input. When the buffer 290 is not enabled it does not produce an output signal at the buffer output.

The delay circuit 292 has an enable input and a delay output. The delay circuit 292 delays enabling the buffer 290 for a second time period after receiving the enable signal at the enable input. In response to receiving the enable signal at the enable input, the delay circuit 292 produces a buffer enable signal having a first value at the delay circuit output which is coupled to the enable input of the buffer 290. The buffer enable signal having the first value disables the buffer 290. In an example, the first value is a 0. Alternatively, the first value is a 1. A time period after receiving the enable signal, the delay circuit 292 enables the buffer 290. The time period after receiving the enable signal, the delay circuit 292 produces the buffer enable signal having a second value different than the first value at the delay circuit output, which is coupled to the first enable input of the buffer 290. The buffer enable signal having the second value enables the buffer 290. In an example, the second value is a 1. Alternatively, the second value is a 0. In an example, the delay circuit 292 enables the buffer 290 a period of time after the bias generator 288 turns off the quick turn on circuit. In some examples, the second time period is around 200 ns, for example from 170 ns to 210 ns. In other examples, the second time period may be a different time value, for example 50 ns, 100 ns, 150 ns, or 250 ns. The second time period is sufficient for the transmitter 284 and the receiver 286 to fully power on and stabilize after receiving the enable signal, enabling the display system components 280 to turn on quickly. The delay circuit 292 delaying the buffer 290 from producing the output signal reduces the appearance of glitches at the output signal, especially when powering up following a deep sleep state.

Figure 3:
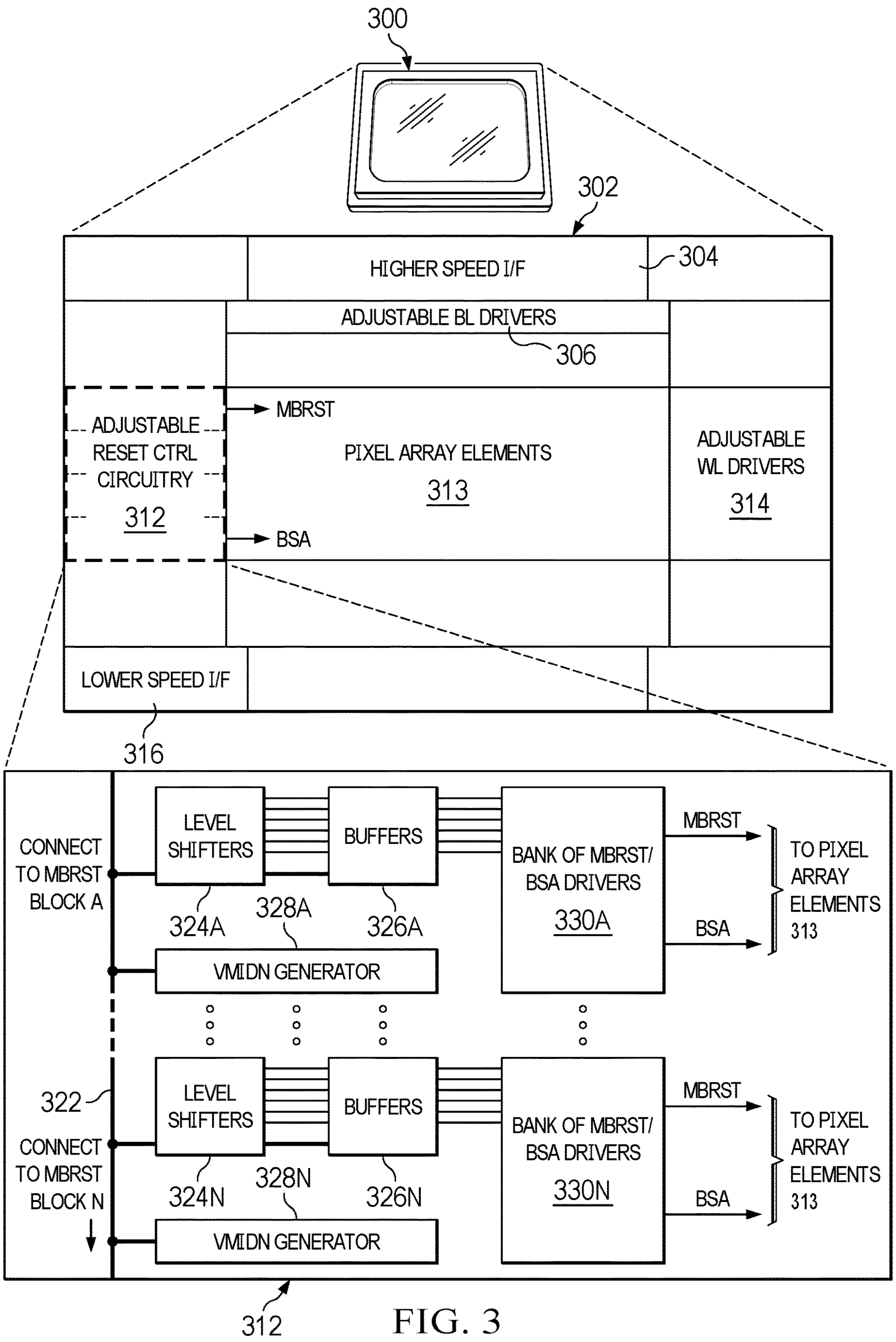
FIG. 3 is a diagram of a light modulator in accordance with various examples.

FIG. 3 is a diagram of a light modulator 300 in accordance with various examples. The light modulator 300 is an example of the light modulator 116 in FIG. 1A, or the light modulator 250. In the example of FIG. 3, the light modulator 300 includes a higher speed interface (I/F) 304, adjustable bitline (BL) drivers 306, adjustable reset control circuitry 312, pixel array elements 313, adjustable wordline (WL) drivers 314, and a lower speed interface 316. In some examples, the adjustable reset control circuitry 312 includes a bus 322, sets of level shifters 324A to 324N, sets of buffers 326A to 326N, VMIDN generators 328A to 328N, and banks of MBRST/BSA drivers 330A to 330N.

In some examples, the higher speed interface 304 receives bitplane data (e.g., 1s and 0s for on/off control of the pixel array elements 313). In some examples, the pixel array elements 313 include memory elements (e.g., SRAM), where the on/off state of each memory element is controlled based on the bitplane data. The pixel array elements 313 also include transmissive or reflective light modulator elements. In some examples, bitplane data indicating an on state for a given pixel array element of the pixel array elements 313 causes: a respective BL driver of the adjustable bitline drivers 306 to be set to 1; a respective WL driver of the adjustable wordline drivers 314 to be enabled; and respective components of the adjustable reset control circuitry 312 to set the MBRST and MSA voltages for a pixel on state. In contrast, bitplane data indicating an off state for a given pixel array element of the pixel array elements 313 causes: a respective BL driver of the adjustable bitline drivers 306 to be set to 0; a respective WL driver of the adjustable wordline drivers 314 to be enabled; and respective components of the adjustable reset control circuitry 312 to set the MBRST and BSA voltages for a pixel off state.

In the example of FIG. 3, the bus 322 is a common line for all reset blocks to receive VMIDN. Each of the set of level shifters 324A to 324N are configured to shift the voltage levels relative to VMIDN. Each of the sets of buffers 326A to 326N are configured to provide buffered voltages to a respective bank of MBRST/BSA drivers 330A to 330N. Each of the VMIDN generators 328A to 328N is configured to provide current to the bus 322. Each of the banks of MBRST/BSA drivers 330A to 330N is configured to output a respective MBRST voltage and a respective BSA voltage responsive to bitplane data and/or other control data. In some examples, the MBRST voltage may be set to a bias voltage (VBIAS) level, a reset voltage (VRESET) level, or an offset voltage level (VOFFSET). In some examples, the BSA voltage is set to the VOFFSET level, a power supply voltage (VCC) level, or a ground (VSS) level. In some examples, the adjustable reset control circuitry 312 and related components operate to create the MBRST and BSA waveforms shown in FIG. 5 for respective reset blocks. In some examples, higher speed data transfers provide the data to control bitlines and wordlines to write data in respective memory cells. In some examples, commands or configuration data received via the lower speed interface 316 may be used to adjust the MBRST and BSA waveform. Such adjustments may be performed at startup or during testing to determine settings for the light modulator 300.

In some examples, control voltages of the light modulator 300 that may be adjustable include: a MBRST voltage and related voltage levels; a BSA voltage and related voltage levels; a wordline voltage; and/or a bitline voltage. In some examples, control currents of the light modulator 300 that may be adjustable include the output current of the VMIDN generators 328A to 328N in FIG. 3, or output current of the voltage regulation circuit 600 in FIG. 6. In some examples, adjusting the control voltages and/or the control currents of the light modulator 300 involves testing or optimizing the adjustable bitline drivers 306, the adjustable wordline drivers 314, and/or the adjustable reset control circuitry 312 to determine minimum control voltages and/or minimum control currents that maintain functionality of the light modulator 300. Once the testing or optimization process determines minimum control voltages, related control voltages of the light modulator 300 may be adjusted to be above (e.g., 5% above, 10% above, or another threshold) the minimum control voltages. Similarly, once the testing or optimization process determines minimum control currents, related control currents of the light modulator 300 may be adjusted to be above (e.g., 5% above, 10% above, or another threshold) the minimum control currents.

Figure 4A:
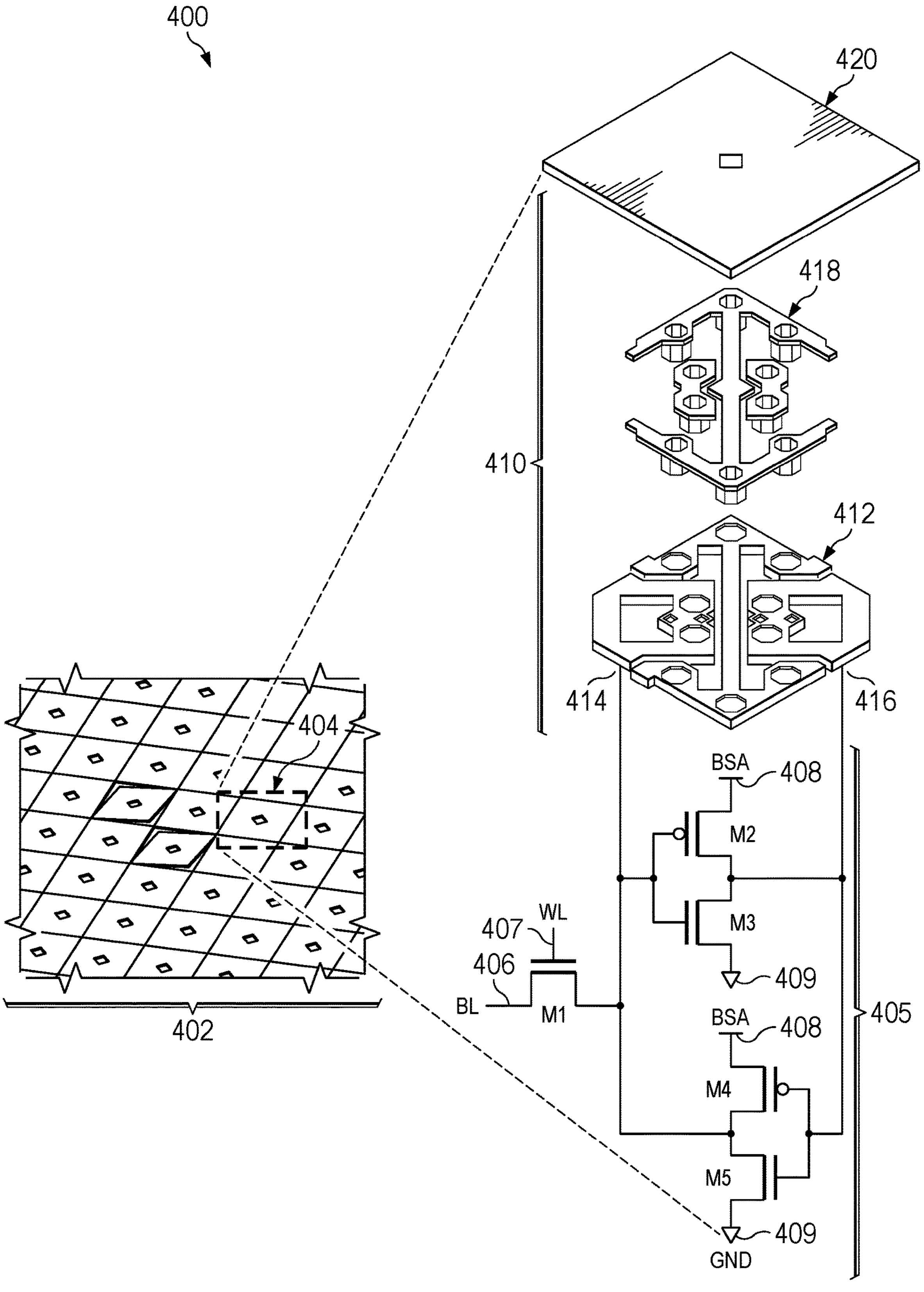
FIGS. 4A and 4B are diagrams of pixel array elements in accordance with various examples.

FIG. 4A is a diagram 400 of pixel array elements 404 in accordance with various examples. In the diagram 400, a pixel array 402 having pixel array elements 404 is represented. In some examples, each pixel array element 404 includes control circuitry 405 and a light modulator element 410. In some examples, the control circuitry 405 has a first terminal 406, a second terminal 407, a third terminal 408, and a ground terminal 409. The control circuitry 405 includes transistors M1 to M5 in the arrangement shown. Each of the transistors M1 to M5 has a first terminal, a second terminal, and a control terminal. In the example of FIG. 4, the transistors M1, M3, and M5 are n-channel field-effect semiconductor (NMOS) transistors. The transistors M2 and M4 are p-channel field-effect semiconductor (PMOS) transistors.

In some examples, the light modulator element 410 includes an electrode layer 412, a MEMS hinge element 418, and a reflective element 420. The electrode layer 412 has a first terminal 414 and a second terminal 416. In the example of FIG. 4, the electrode layer 412, the MEMS hinge element 418, and the reflective element 420 are shown in an exploded view. When assembled, the electrode layer 412, the MEMS hinge element 418, and the reflective element 420 enable the reflective element 420 to maintain two or more positions (e.g., an on position and an off position) responsive to control signals from the control circuitry 405. In different examples, the size, the layout, the on/off positions of the electrode layer 412, the MEMS hinge element 418, and the reflective element 420 may vary.

In some examples, the control circuitry 405 is an SRAM memory element. As shown, the first terminal of the transistor M1 is coupled to the first terminal 406 of the control circuitry 405. The second terminal of the transistor M1 is coupled to the control terminals of the transistors M2 and M3, the second terminal of the transistor M4, the first terminal of the transistor M5, and the first terminal 414 of the electrode layer 412. The first terminal of the transistor M2 is coupled to the third terminal 408 of the control circuitry 405. The second terminal of the transistor M2 is coupled to the first terminal of the transistor M3, the control terminals of the transistors M4 and M5, and the second terminal 416 of the electrode layer 412. The second terminal of the transistor M3 is coupled to ground or the ground terminal 409. The first terminal of the transistor M4 is coupled to the third terminal 408 of the control circuitry 405. The second terminal of the transistor M5 is coupled to ground or the ground terminal 409.

In some examples, the control circuitry 405 is configured to: receive a BL voltage at the first terminal 406; receive a WL voltage at the second terminal 407; receive a BSA voltage at the third terminal 408; and provide control voltages at the first terminal 414 and the second terminal 416 of the electrode layer 412 responsive to the BL voltage, the WL voltage, and the BSA voltage. For a pixel on state of the light modulator element 410, BL is set to 1, and WL is enabled. For a pixel off state of the light modulator element 410, BL is set to 0, and WL is enabled. As needed, a reset operation is performed using the MBRST and BSA waveforms shown in FIG. 5.

Figure 4B:
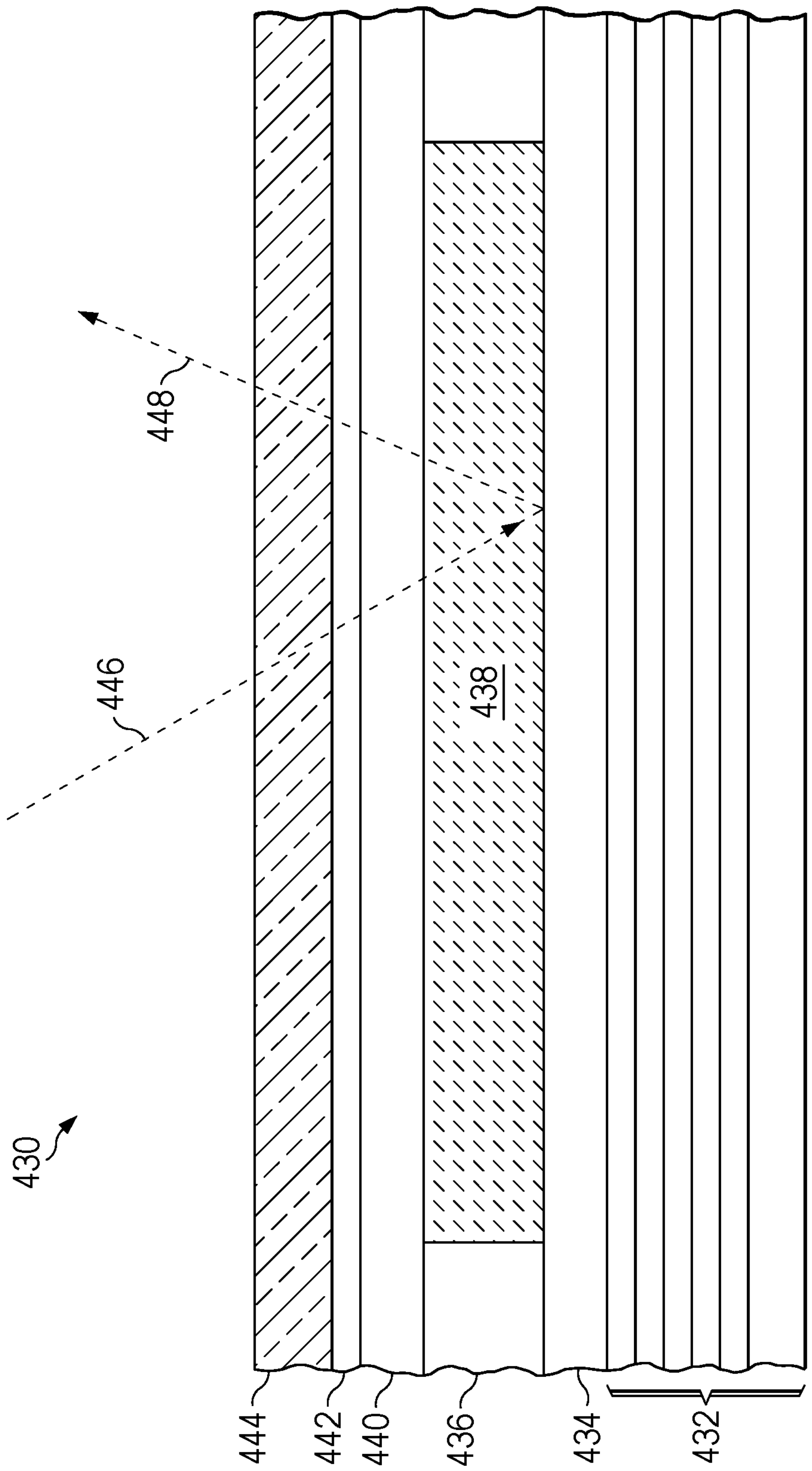

FIG. 4B is a diagram 430 of a LCoS pixel array element in accordance with various examples. In the diagram 430, the LCoS pixel array element includes a control circuit layer 432, a first layer 434, seals 436, a liquid crystal layer 438, a second layer 440, a third layer 442, and a fourth layer 444. In the example of FIG. 4B, control circuit layer 432 includes one or more pixels pads that can be set to different voltage levels. In some examples, the first layer 434 includes a dielectric mirror. The liquid crystal layer 438 includes liquid crystal molecules. In some examples, the second layer 440 includes a glass electrode. When a pixel pad of the control circuit layer 432 is set to a voltage level, the pixel pad and the glass electrode form a capacitor that affects orientation of the liquid crystal molecules of the liquid crystal layer 438. In some examples, the third layer 442 and/or the fourth layer 444 include a silicon layer or cap.

With the LCoS pixel array element of FIG. 4B, the absorption of incident light 446 through the liquid crystal layer 438 is zero and the applied voltage on a pixel pad results in full control over the phase retardation of the incident wavefront across the pixel array element, resulting in modulated light 448. In different examples, two possible modulations (amplitude modulation and phase modulation) may be applied for each pixel.

Figure 5:
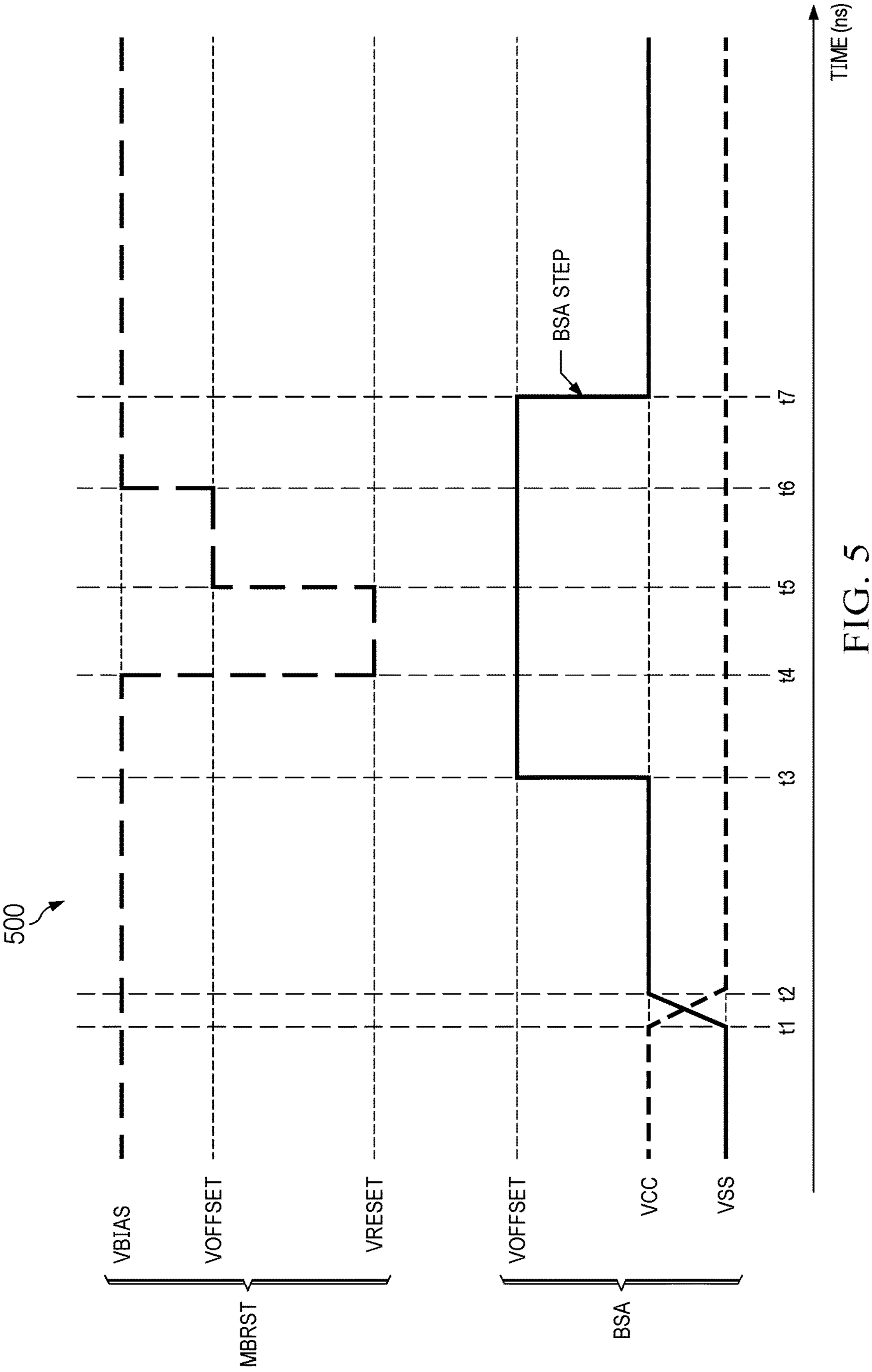
FIG. 5 is a timing diagram of control voltages for a light modulator in accordance with various examples.

FIG. 5 is a timing diagram 500 of control voltages for a light modulator in accordance with various examples. In the example of FIG. 5, the control voltages represented in the timing diagram 500 include an MBRST voltage and a BSA voltage. During light modulator operations, the MBRST voltage transitions between a VBIAS level, a VRESET level, and a VOFFSET level. The BSA voltage transitions between the VOFFSET level, and the VCC level. The MBRST and BSA transitions in FIG. 5 cause a pixel array element to switch from one state to another depending on the data written during a higher speed write. More specifically, at time t1, the MBRST voltage is set to VBIAS, and the BSA voltage is set to VSS. At time t2, the BSA voltage transitions from VSS to VCC. At time t3, the BSA voltage transitions from VCC to VOFFSET. At time t4, the MBRST voltage transitions from VBIAS to VRESET. At time t5, the MBRST voltage transitions from VRESET to VOFFSET. At time t6, the MBRST voltage transitions from VOFFSET to VBIAS. At time t7, the BSA voltage transitions from VOFFSET to VCC. With the MBRST and BSA waveforms in FIG. 5, a memory cell is written to from time t1 to time t2. From times t3 to t7, the MBRST and BSA waveforms are used to change the state (e.g., mirror position) of a pixel array element.

Figure 6:
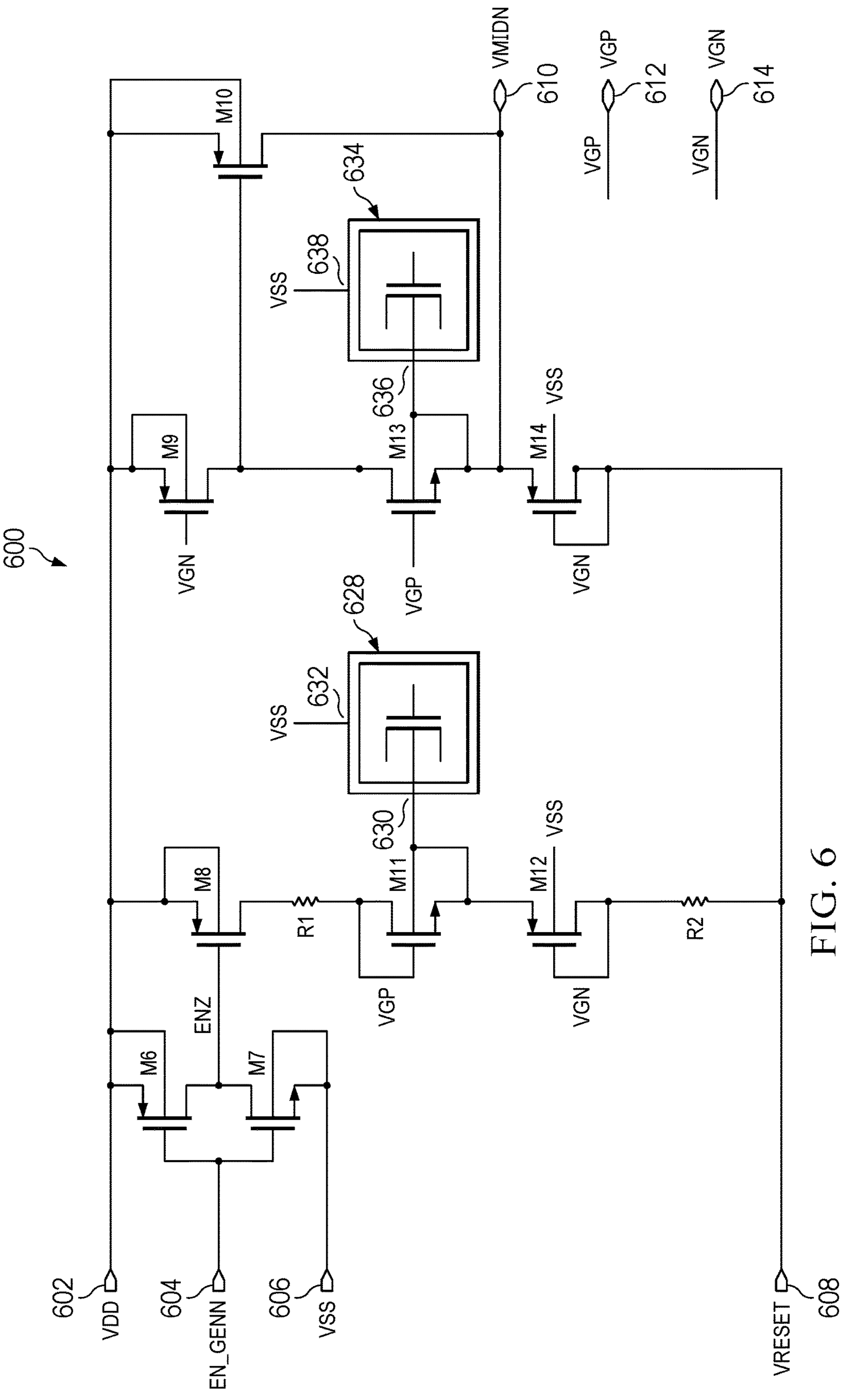
FIG. 6 is a schematic diagram of a voltage regulation circuit for a light modulator in accordance with various examples.

FIG. 6 is a schematic diagram of voltage regulation circuit 600 for a light modulator in accordance with various examples. The voltage regulation circuit 600 is an example of each of the VMIDN generators 328A to 328N in FIG. 3. In the example of FIG. 6, the voltage regulation circuit 600 generates VMIDN. In some examples, the voltage regulation circuit 600 has a first terminal 602, a second terminal 604, a third terminal 606, a fourth terminal 608, a fifth terminal 610, a sixth terminal 612, and a seventh terminal 614. In some examples, the voltage regulation circuit 600 includes transistors M6 to M14, resistors R1 and R2, transistor well 628 for the transistor M11, and transistor well 634 for the transistor M13. Each of the transistors M6 to M14 has a respective first terminal, a respective second terminal, a respective body terminal, and a respective control terminal. In the example of FIG. 6, the transistors M6, M8, M9, M10, M12, and M14 are PMOS transistors, and the transistors M7, M11, and M13 are NMOS transistors. The transistor well 628 has a first terminal 630 and a second terminal 632. The transistor well 634 has a first terminal 636 and a second terminal 638.

The first terminal and the body terminal of the transistor M6 are coupled to the first terminal 602 of the voltage regulation circuit 600. The second terminal of the transistor M6 is coupled to the first terminal of the transistor M7 and the control terminal of the transistor M8. The control terminals of the transistors M6 and M7 are coupled to the second terminal 604 of the voltage regulation circuit 600. The second terminal and the body terminal of the transistor M7 are coupled to the third terminal 606 of the voltage regulation circuit 600. The first terminal and the body terminal of the transistor M8 are coupled to the first terminal 602 of the voltage regulation circuit 600. The second terminal of the transistor M8 is coupled to the first terminal of the resistor R1. The second terminal of the resistor R1 is coupled to the first terminal and the control terminal of the transistor M11. The control terminal of the transistor M11 is also coupled to the sixth terminal 612 of the voltage regulation circuit 600. The second terminal and the body terminal of the transistor M11 are coupled to the first terminal of the transistor M12 and the first terminal 630 of the transistor well 628. The second terminal 632 of the transistor well 628 is coupled to the third terminal 606 of the voltage regulation circuit 600. The control terminal of the transistor M12 is coupled to the seventh terminal 614 of the voltage regulation circuit 600. The body terminal of the transistor M12 is coupled to the third terminal of the voltage regulation circuit 600. The second terminal of the transistor M12 is coupled to the first terminal of the resistor R2 and the control terminal of the transistor M12. The second terminal of the resistor R2 is coupled to the fourth terminal 608 of the voltage regulation circuit 600.

The first terminal and the body terminal of the transistor M9 are coupled to the first terminal 602 of the voltage regulation circuit 600. The second terminal of the transistor M9 is coupled to the first terminal of the transistor M13 and the control terminal of the transistor M10. The control terminal of the transistor M9 is coupled to the sixth terminal 612 of the voltage regulation circuit 600. The second terminal and the body terminal of the transistor M13 are coupled to the first terminal of the transistor M14 and the first terminal 636 of the transistor well 634. The second terminal 638 of the transistor well 634 is coupled to the third terminal 606 of the voltage regulation circuit 600. The control terminal of the transistor M13 is coupled to the sixth terminal 612 of the voltage regulation circuit 600. The second terminal and the control terminal of the transistor M14 are coupled to the fourth terminal 608 of the voltage regulation circuit 600. The body terminal of the transistor M14 is coupled to the third terminal 606 of the voltage regulation circuit 600. The first terminal and the body terminal of the transistor M10 are coupled to the first terminal 602 of the voltage regulation circuit 600. The second terminal of the transistor M10 is coupled to the fifth terminal 610 of the voltage regulation circuit 600.

In the example of FIG. 6, the voltage regulation circuit 600 is configured to: receive VDD at the first terminal 602; receive an enable signal (EN_GENN) at the second terminal 604; receive VRESET at the fourth terminal 608; receive a p-channel gate voltage (VGP) at the sixth terminal; receive an n-channel gate voltage (VGN) at the seventh terminal 614; and provide VMIDN at the fifth terminal 610 responsive to VDD, EN_GENN, VGP, VGN, and VRESET. With the voltage regulation circuit 600, current of each VMIDN generator can be reduced compared to other voltage regulation circuits. One way to reduce current for each VMIDN generator is by reducing the size of transistors such as the transistor M8. Another way to reduce current provided by a set of VMIDN generators (e.g., the VMIDN generators 328A to 328N) is to selectively disable select VMIDN generators. In some examples, selective disabling of select MVIDN generators is based on metal layer revisions for the voltage regulation circuit 600 and testing. With metal layer revisions, any number of VMIDN generators may be disabled and testing may be performed to determine the minimum number of VMIDN generators needed for light modulator functionality. Such metal layer revisions are faster and less costly than full mask revisions and may be useful for testing. After testing, the design of a light modulator chip may be optimized to include the number of VMIDN generators needed to support functionality. Such optimization may involve a full mask revision of a light modulator chip based on test results, where the updated design minimizes power consumption and area (by eliminating some voltage or current regulation circuits that were identified during testing to be excessive).

For different types/sizes of light modulators, the number of VMIDN generators needed to support functionality may vary. In some examples, the number of voltage regulation circuits 600 used to maintain pixel performance may be selected to reduce power with low-cost metal only revisions. As used herein, "metal only revisions" or "metal layer revisions" refer to a fabrication or testing process to minimally modify a design (e.g., the number of functional VMIDN generators) by adjusting one or metal layers of an IC without changing other aspects of the design.

In some examples, the voltage regulation circuit 600 reduces current for VRESET by approximately 50%, which is suitable for example pixels that have a pixel size which may be less than five microns, for example about 4.5 microns. In some examples, additional metal layer revision may be added to the voltage regulation circuit 600 or other voltage regulation or current regulation circuits to facilitate testing and adjustment of control voltages and/or control currents for a light modulator. In some examples, the size of the transistor M8 in the voltage regulation circuit 600 is reduced compared to other voltage regulation circuits. In some examples, reduction of VMIDN by the voltage regulation circuit 600 results in a ~10% reduction in overall light modulator power consumption. In some examples, stress testing of voltage regulation circuitry, such as the voltage regulation circuit 600, is done by lowering VRESET and performing a test that asserts VRESET for all pixel array elements at the same time to determine a maximum current draw. The results of this test may be another way to determine a suitable number of VMIDN generators or other voltage regulation/current regulation circuitry.

Figure 7:
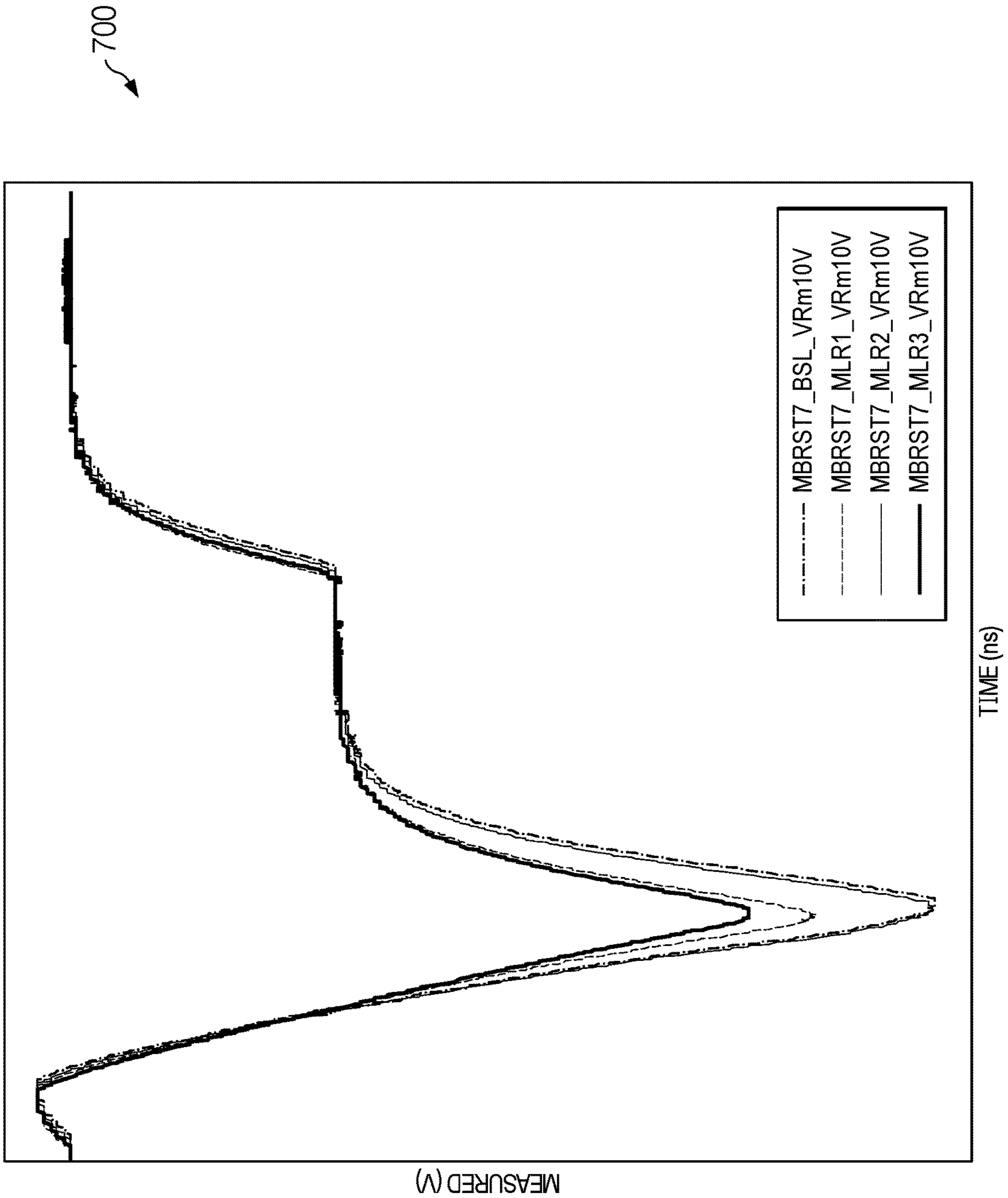
FIG. 7 is a graph of global reset waveforms for different reset voltages of a light modulator in accordance with various examples.

FIG. 7 is a graph 700 of global reset waveforms for different reset voltages of a light modulator in accordance with various examples. The global reset waveforms includes a baseline MBRST waveform (MBRST7_BSL), a first metal level revision (MLR) MBRST waveform (MBRST7_MLR1), a second MLR MBRST waveform (MBRST7_MLR2), and a third MLR MBRST waveform (MBRST7). In stress testing, the second MLR MBRST waveform is approximately the same as the baseline MBRST waveform indicating at least a 50% current reduction is possible by reducing VRESET. In some examples, MLR1 is a 50% metal layer reduction, MLR2 is a 25% metal layer reduction, and MLR3 is a 12.5% metal layer reduction.

Figure 8:
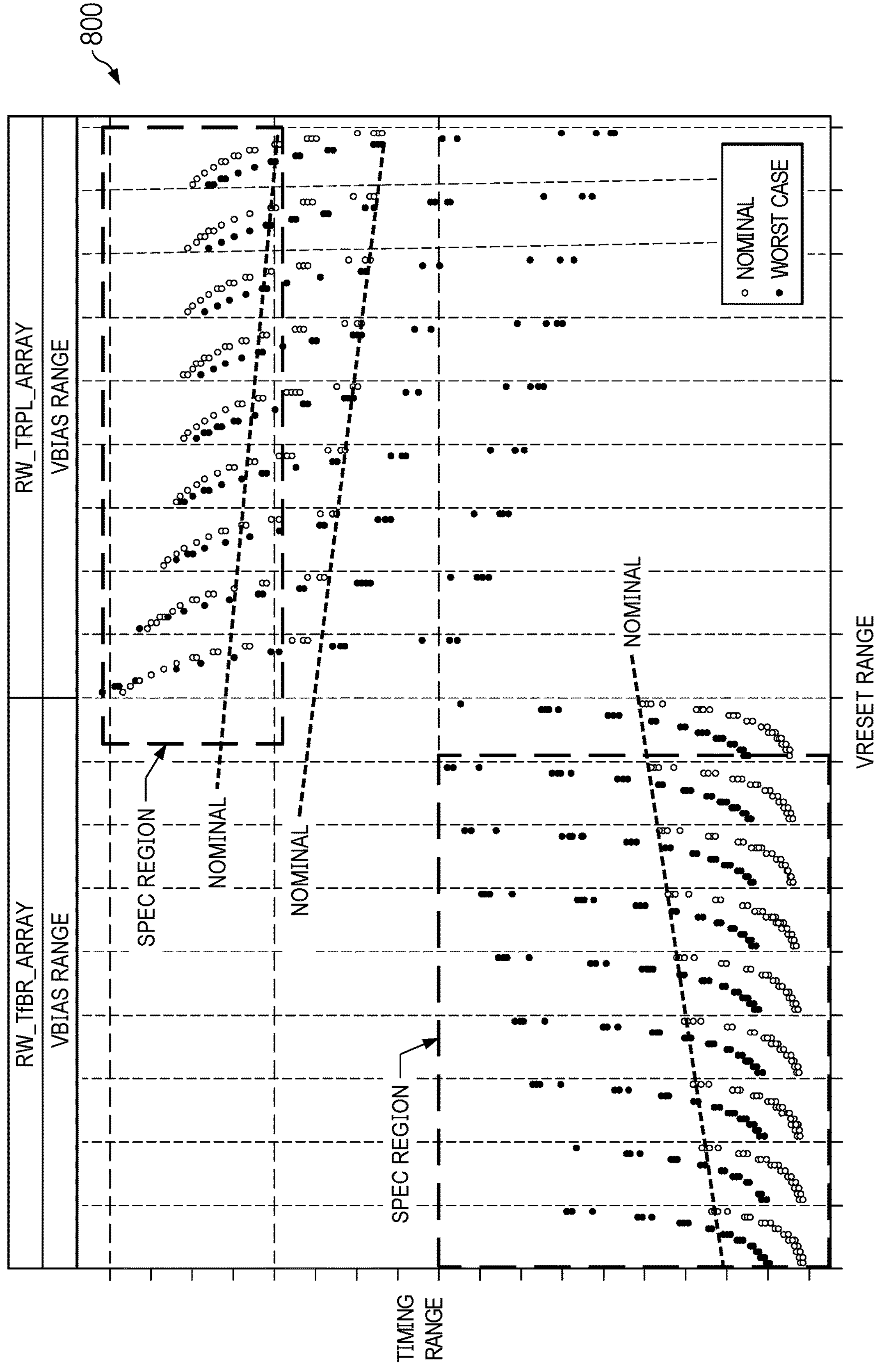
FIG. 8 is a graph of reset timing variance for different reset voltage and bias voltage values of a light modulator in accordance with various examples.

FIG. 8 is a graph 800 of reset timing variance for different VRESET and VBIAS values of a light modulator in accordance with various examples. For different values of VRESET and VBIAS, the reset timing varies.

Figure 9:
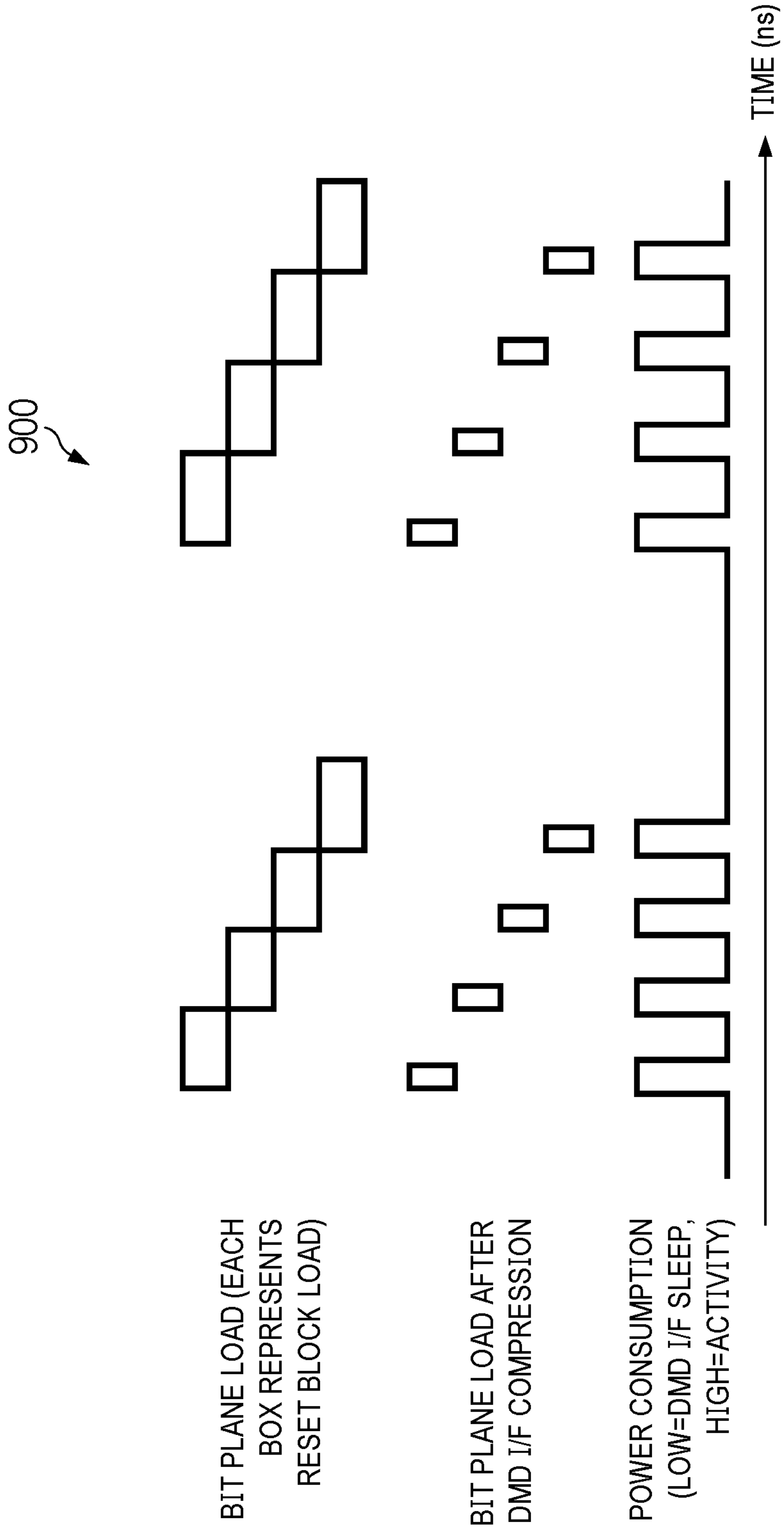
FIG. 9 is a diagram of data loads and related power consumption of a light modulator in accordance with various examples.

FIG. 9 is a diagram 900 of data loads and related power consumption of a light modulator in accordance with various examples. In the diagram 900, bitplane data loads, bitplane data loads after interface compression, and power consumption are represented for a light modulator. More specifically, each bitplane load box represents a reset block load of image data to a light modulator. In some scenarios, bitplane data loads can be compressed. The compressed bitplane loads provide image data to a light modulator, which may decompress the compressed bitplane loads or provide lower resolution image display based on the compressed bitplane loads. In the example of FIG. 9, the power consumption waveform is low when an interface (e.g., the interface 118 in FIG. 1A or related components) is asleep and is high when there is activity on the interface. With a smaller light modulator, the power consumption is reduced by approximately 15% compared to a larger light modulator due to power savings features such as use of medium and deep sleep modes with faster wake-up. Use of compressed bitplane loads may be used increase the amount of time sleep modes (or to increase the amount of times medium and/or deep sleep modes) may be used, which reduces power consumption.

Figure 10:
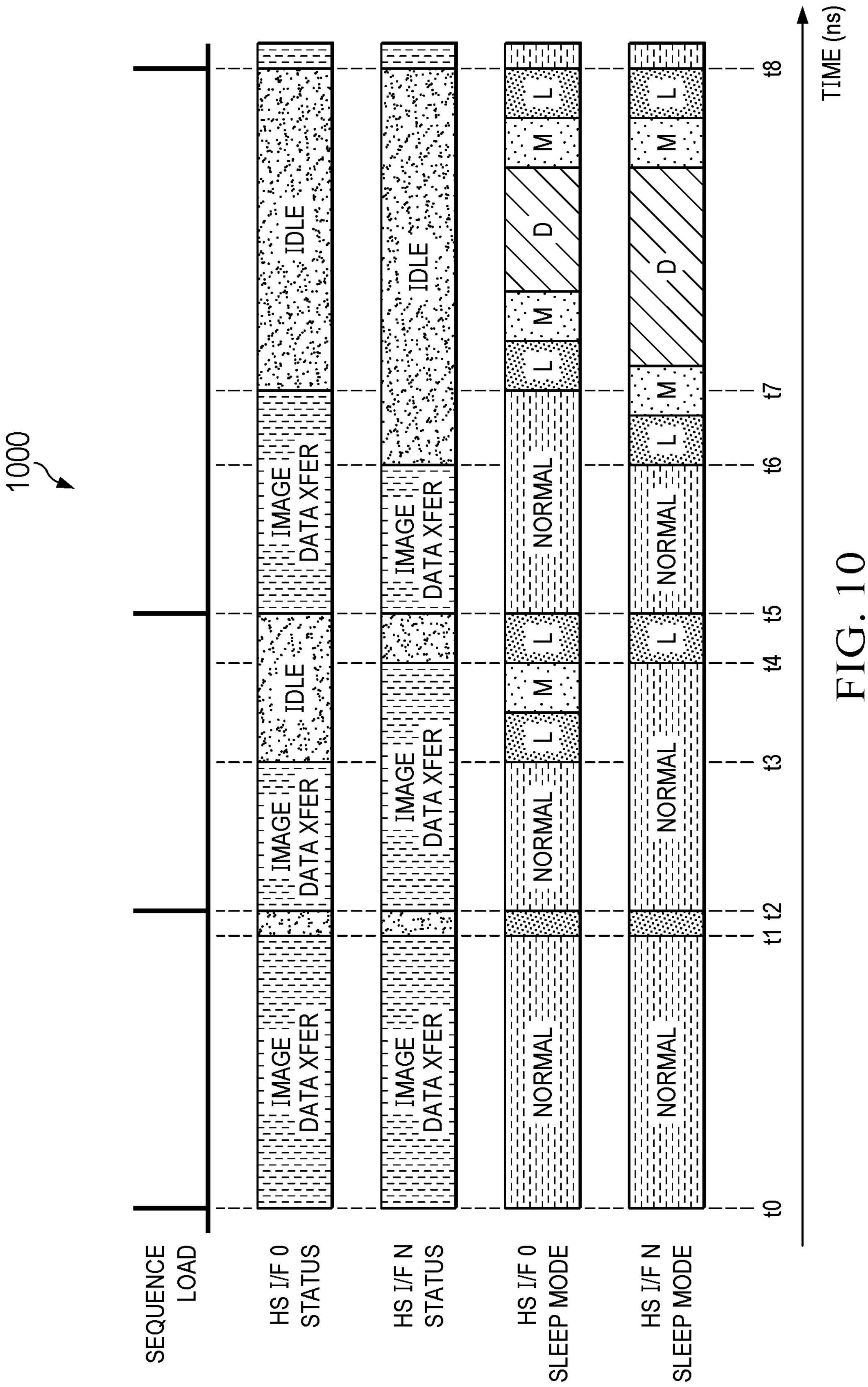
FIG. 10 is a diagram of higher speed data transfer intervals, idle intervals, and sleep intervals for a light modulator controller in accordance with various examples.

FIG. 10 is a diagram 1000 of higher speed data transfer intervals, idle intervals, and sleep intervals for a light modulator controller in accordance with various examples. In the diagram 1000, sequence load triggers, a higher speed interface 0 status, a higher speed interface N status, a higher speed interface 0 sleep mode of a light modulator controller, and a higher speed interface N sleep mode of a light modulator controller are represented.

At time t0, a first sequence load trigger occurs. From time t0 to time t1, the higher speed interface 0 status is a first image data transfer via the higher speed interface 0. From time t0 to time t1, the higher speed interface N status is a first image data transfer via the higher speed interface N. From time t0 to time t1, the higher speed interface 0 sleep mode of the light modulator controller is normal (active with no sleep mode), and the higher speed interface N sleep mode of the light modulator controller is normal.

From time t1 to time t2, the higher speed interface 0 status is a first idle interval of the higher speed interface 0. From time t1 to time t2, the higher speed interface 0 sleep mode of the light modulator controller is a light sleep mode. From time t1 to time t2, the higher speed interface N sleep mode of the light modulator controller is the light sleep mode. As used herein, the "light sleep mode" includes gating the higher speed clock.

At time t2, a second sequence load trigger occurs. From time t2 to time t3, the higher speed interface 0 status is a second image data transfer via the higher speed interface 0. From time t2 to time t3, the higher speed interface N status is a second image data transfer via the higher speed interface N. From time t2 to time t3, the higher speed interface 0 sleep mode of the light modulator controller is normal (no sleep mode), and the higher speed interface N sleep mode of the light modulator controller is normal.

From time t3 to t4, the higher speed interface 0 status is a second idle interval of the higher speed interface 0. From time t3 to t4, the higher speed interface N status remains in the second image data transfer of the higher speed interface N. From time t3 to t4, the higher speed interface 0 sleep mode of the light modulator controller is the light sleep mode and a medium sleep mode. From time t3 to t4, the higher speed interface N sleep mode of the light modulator controller is normal. As used herein, the "medium sleep mode" includes fast entry and exit. In some examples, fast entry to the medium sleep mode may be due to not waiting for all higher speed interfaces to go idle before entry. In some examples, fast exit from the medium sleep mode may be due to use of a deglitch circuit. With fast entry into and fast exit from the medium sleep mode, the duration of the medium sleep mode can be increased, which reduces overall power consumption.

From time t4 to t5, the higher speed interface 0 status continues in the second idle interval of the higher speed interface 0. From time t4 to t5, the higher speed interface N status is in a second idle interval of the higher speed interface N. From time t4 to t5, the higher speed interface 0 sleep mode of the light modulator controller is the light sleep mode. From time t4 to t5, the higher speed interface N sleep mode of the light modulator controller is the light sleep mode.

At time t5, a third sequence load trigger occurs. From time t5 to t6, the higher speed interface 0 status is a third image data transfer of the higher speed interface 0. From time t5 to t6, the higher speed interface N status is a third image data transfer of the higher speed interface N. From time t5 to t6, the higher speed interface 0 sleep mode of the light modulator controller is normal (no sleep mode), and the higher speed interface N sleep mode of the light modulator controller is normal.

From time t6 to time t7, the higher speed interface 0 status is the third image data transfer of the higher speed interface 0. From time t6 to time t7, the higher speed interface N status is a third idle interval of the higher speed interface N. From time t6 to time t7, the higher speed interface 0 sleep mode of the light modulator controller is normal, and the higher speed interface N sleep mode of the light modulator controller includes the light sleep mode and the medium sleep mode.

From time t7 to t8, the higher speed interface 0 status is a third idle interval of the higher speed interface 0. From time t7 to t8, the higher speed interface N status is the third idle interval of the higher speed interface N. From time t7 to t8, the higher speed interface 0 sleep mode of the light modulator controller includes the light sleep mode, the medium sleep mode, a deep sleep mode, the medium sleep mode, and the light sleep mode. From time t7 to t8, the higher speed interface N sleep mode of the light modulator controller includes the medium sleep mode, the deep sleep mode, the medium sleep mode, and the light sleep mode. As used herein, the "deep sleep mode" includes optimized/programmable power down of additional components compared to the medium sleep mode. Because the deep sleep mode is nested in the medium sleep mode (with fast entry and exit times, the duration of the deep sleep mode may be increased, which reduces overall power consumption.

In the example of FIG. 10, the sleep modes for the higher speed interfaces 0 and N do not necessarily match or align with each other. For example, from time t3 to time t4, the higher speed interface 0 sleep mode of the light modulator controller includes the light sleep mode and the medium sleep mode while the higher speed interface N sleep mode of the light modulator controller is normal. Also, from time t6 to time t7, the higher speed interface 0 sleep mode of the light modulator controller is normal while the higher speed interface N sleep mode of the light modulator controller includes the light sleep mode and the medium sleep mode. Also, from time t7 to time t8, the duration of the deep sleep mode is shorter for the higher speed interface 0 than for the higher speed interface N. By varying the sleep mode for each higher speed interface, power consumption is reduced. In some examples, for AR (or other applications with longer idle times), additional components may be powered down for the deep sleep mode.

Figure 11A:
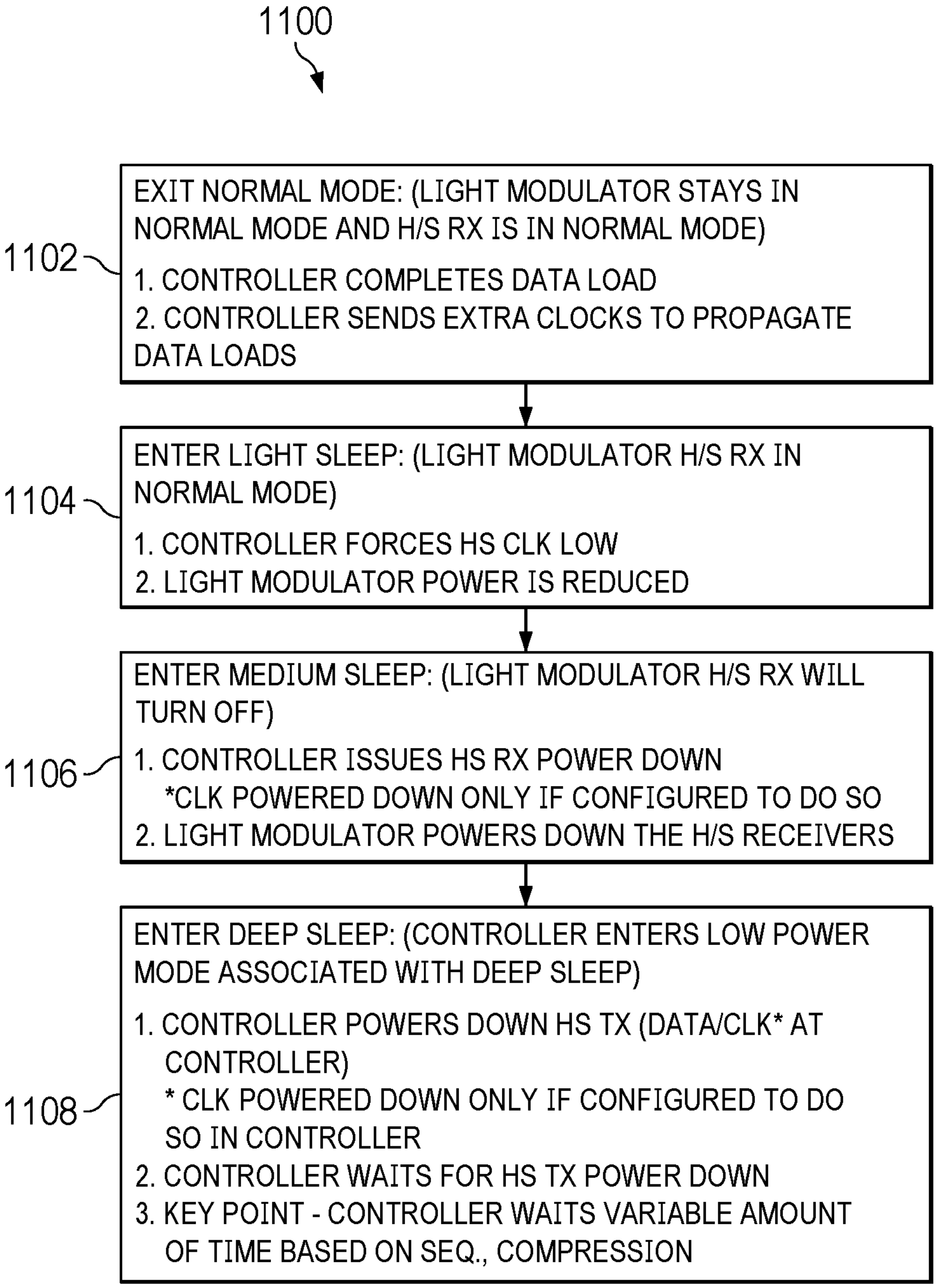
FIG. 11A is a flowchart of sleep mode entry methods for a light modulator controller in accordance with various examples.

FIG. 11A is a flowchart of sleep mode entry methods 1100 for a light modulator controller in accordance with various examples. The sleep mode entry methods 1100 may be performed, for example, by a controller (e.g., the controllers 104 in FIG. 1A, or the controller 270 in FIG. 2A) and a light modulator (e.g., the light modulator 116 in FIG. 1A, the light modulator 250 in FIG. 2A, or the light modulator 300 in FIG. 3). In the example of FIG. 11A, the sleep mode entry methods 1100 include exiting a normal mode at block 1102. When a controller exits the normal mode at block 1102, a light modulator (e.g., the light modulator 116 in FIG. 1A, the light modulator 250 in FIG. 2A, or the light modulator 300 in FIG. 3) and higher speed receiver circuitry (e.g., part of the higher speed interface 304 in FIG. 3) stay in a normal mode. During block 1102, the controller may: complete a data load to the light modulator; and send extra clocks to enable the data to propagate through the light modulator logic. At block 1104, a light sleep mode is entered. During block 1104, the light modulator higher speed receiver circuitry is in a normal mode. Also, during block 1104, a controller may: force a higher speed clock to a low state (e.g., by gating the higher speed clock); and light modulator power consumption is reduced. At block 1104, a medium sleep mode is entered. During block 1106, the light modulator higher speed receiver circuitry is turned off. For example, during block 1106, a controller may issue a higher speed receiver circuitry power down instruction using a lower speed interface command. Also, during block 1106, a light modulator powers down the higher speed receiver circuitry responsive to the instruction and a predetermined setting (the setting allowing the higher speed receiver circuitry to be turned off or not). At block 1108, a deep sleep mode is entered. During block 1108, the controller enter a low power mode associated with deep sleep. In some examples, during block 1108, the controller: powers down higher speed transmitter circuitry (e.g., part of the higher speed interface circuitry 230 in FIG. 2A); and waits for the higher speed transmitter circuitry to power down. In some examples, the controller waits for a variable amount of time based on a control sequence, compression options, or other parameters. In one example, a controller may wait approximately 80 ns before the higher speed transmitter circuitry is powered down during block 1108. In some examples, the amount of time a controller waits has a minimum of approximately 33 ns and no specific maximum time.

Figure 11B:
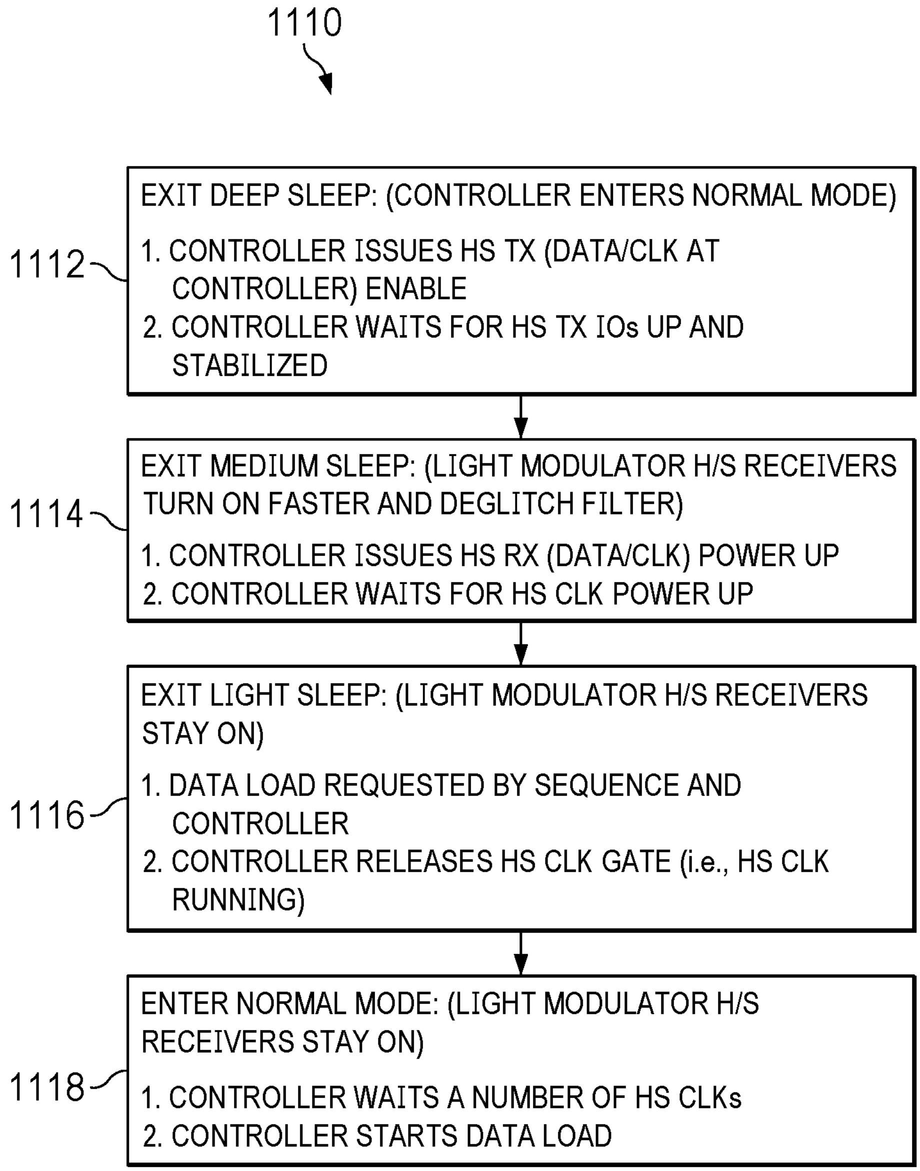
FIG. 11B is a flowchart of sleep mode exit methods for a light modulator controller in accordance with various examples.

FIG. 11B is a flowchart of sleep mode exit methods 1110 for a light modulator controller in accordance with various examples. The sleep mode exit methods 1110 may be performed, for example, by a controller (e.g., the controllers 104 in FIG. 1A, or the controller 270 in FIG. 2A) and a light modulator (e.g., the light modulator 116 in FIG. 1A, the light modulator 250 in FIG. 2A, or the light modulator 300 in FIG. 3). At block 1112, a deep sleep mode is exited. During block 1112, the controller enters normal mode. Example operation of block 1112 include: the controller issues an enable signal to the light modulator via higher speed transmitter circuitry; and waits for the higher speed transmitter inputs/outputs to be stabilized. In some examples, the amount of time that the controller waits for the higher speed transmitter inputs/outputs to be stabilized may vary. At block 1114, a medium sleep mode is exited. During block 1114, light modulator receiver circuitry is turned on. In some examples, turning on light modulator receiver circuitry during block 1114 is fast due to use of a deglitch circuit coupled to receiver circuitry.

In some examples, the deglitch circuit includes a bias generator (e.g., the bias generator 288 in FIG. 2B). The bias generator turns on receiver circuitry (e.g., the receiver 286 in FIG. 2B) quickly by rapidly ramping up the bias current initially in response to receiving an enable signal by turning on a quick turn on circuit in the bias generator. The bias generator stabilizes the bias current as the bias current settles. The deglitch circuit also includes a buffer (e.g., the buffer 290 in FIG. 2B) coupled to the receiver circuitry and a delay circuit (e.g., the delay circuit 292 in FIG. 2B) coupled to the buffer. The delay circuit, which may be a timer, such as an analog RC timer, prevents the clock and data received by the receiver from being output by the buffer until the timer expires. For example, the buffer may hold all output signals low until the timer expires. For example, the delay circuit may produce a buffer enable signal having a first value in response to receiving an enable signal, disabling the buffer. A time period after receiving the deglitch enable signal, the delay circuit produces a buffer enable signal having a second value different than the first value, enabling the buffer. In an example, the time period expires after the bias generator turns off the quick turn on circuit.

In some examples, during block 1114, the controller: issues a command to higher speed receiver circuitry of a light modulator via a lower speed interface command; and waits for a higher speed clock to power up. In some examples, use of a deglitch circuit reduces the wait time by approximately 10× (e.g., 200 ns instead of 2000 ns) compared to the wait time without the deglitch circuit. At block 1116, a light sleep mode is exited. During block 1116, higher speed receiver circuitry of a light modulator stays on. During block 1116, a controller and related sequence may request a data load. Also, during block 1116, a controller may release higher speed clock gating, which cause the higher speed clock to run. At block 1118, a normal mode is entered. During block 1118, higher speed receiver circuitry of a light modulator stays on. Also, during block 1118, a controller may wait a number of higher speed clock cycles (e.g., 10 to 20 clock cycles) and then start data loads to the light modulator.

Figure 12:
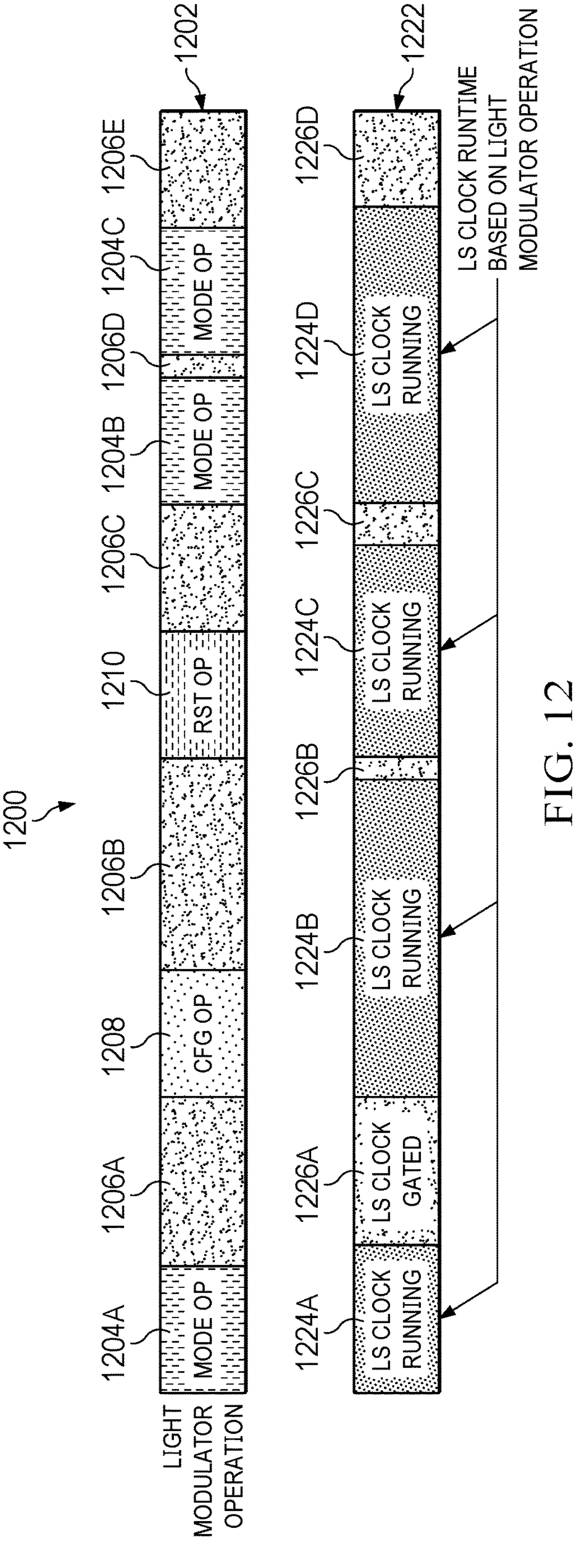
FIG. 12 is a diagram of lower speed data transfer intervals and idle intervals for a spatial light modulator controller with and without clock gating in accordance with various examples.

FIG. 12 is a diagram 1200 of lower speed data transfer intervals and idle intervals for a light modulator controller with clock gating in accordance with various examples. In the diagram 1200, lower speed interface light modulator operations 1202 include mode operations 1204A, 1204B, and 1204C, a configuration operation 1208, and a reset operation 1210. In the example of FIG. 12, each of the mode operations 1204A, 1204B, and 1204C, the configuration operation 1208, and the reset operation 1210 are separated by idle intervals including idle intervals 1206A to 1206E. In some examples, a lower speed interface control technique directs the lower speed clock 1222 to be on during intervals 1224A to 1224D and to be gated during intervals 1226A to 1226D, where the intervals 1226A to 1226D are at least partially aligned with the idle intervals 1206A to 1206E. In some examples, the lower speed clock 1222 stays on during part of the idle intervals 1206A, 1206B, 1206C, and 1206E to enable the light modulator to process/execute an issued command. In some scenarios, commands may be issued back-to-back (e.g., the mode operations 1204B and 1204C) such that there is an insufficient idle time (e.g., the idle time 1206D) between processing/executing consecutive commands to gate the lower speed clock.

In different examples, mode control, configuration options, and other control options related to a lower speed interface may vary for different light modulators. For each mode change, configuration change, or other control change there may be the same or a different amount of clock periods needed to complete an update. In some examples, clock gating for the lower speed interface may account for such variations to optimize power consumption while ensuring mode changes, configuration changes, and/or other control changes are successfully completed.

Figure 13A:
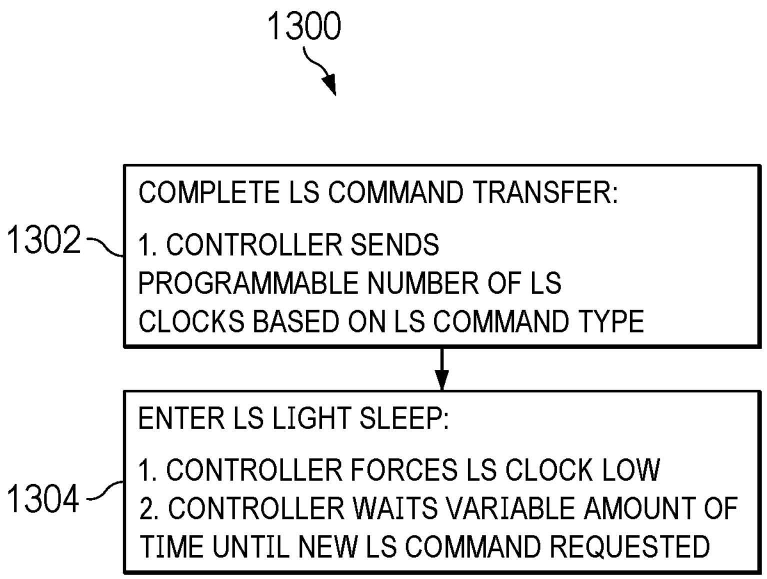
FIG. 13A is a flowchart of a lower speed clock gating start method for a light modulator controller in accordance with various examples.

FIG. 13A is a flowchart of a lower speed clock gating start method 1300 for a light modulator controller in accordance with various examples. The lower speed clock gating start method 1300 may be performed, for example, by the controllers 104 in FIG. 1A, or the controller 270 in FIG. 2A. As shown, the lower speed clock gating start method 1300 include completing a lower speed command transfer at block 1302. During block 1302, the controller sends a programmable number of lower speed clock cycles to a light modulator based on a lower speed command type. In some examples, the programmable number of lower speed clock cycles may vary depending on the lower speed command type. At block 1304, a lower speed light sleep mode is entered. During block 1304, a controller: forces a lower speed clock to be low (e.g., by gating the lower speed clock); and waits for a variable about of time until a new lower speed command is requested.

Figure 13B:
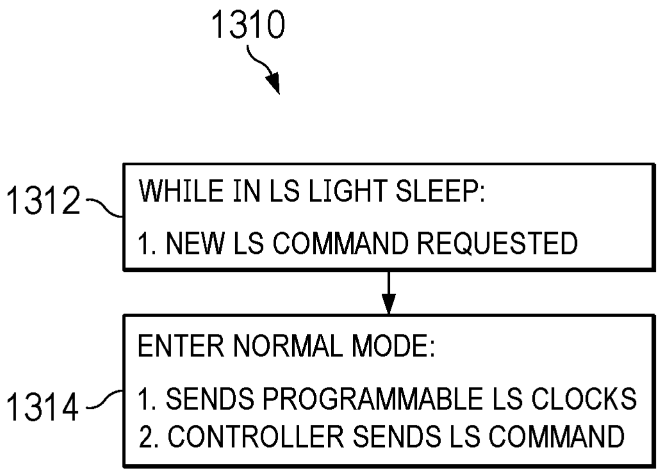
FIG. 13B is a flowchart of a lower speed clock gating end method for a light modulator controller in accordance with various examples.

FIG. 13B is a flowchart of lower speed clock gating end method 1310 for a light modulator controller in accordance with various examples. The lower speed clock gating end method 1310 may be performed, for example, by the controllers 104 in FIG. 1A, or the controller 270 in FIG. 2A. At block 1312, a new lower speed command is requested while in the lower speed light sleep mode. At block 1314, a normal mode is entered responsive to the new lower speed command. During block 1314, a controller: sends a number of lower speed clocks (e.g., 2 lower speed clocks); and sends the lower speed command to a light modulator.

Figure 14A:
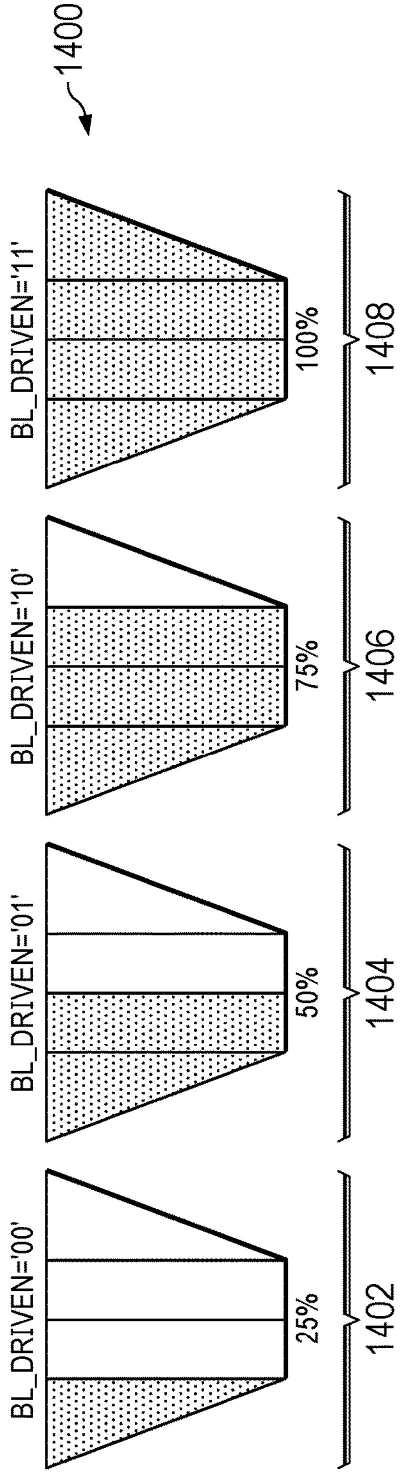
FIG. 14A is a diagram of bitline driver power control for a light modulator in accordance with various examples.

FIG. 14A is a diagram of bitline driver power control 1400 for a light modulator in accordance with various examples. The bitline driver power control 1400 may be used with the adjustable bitline drivers 306 in FIG. 3. As shown, the bitline driver power control 1400 include a first bitline driver power setting 1402, a second bitline driver power setting 1404, a third bitline driver power setting 1406, and a fourth bitline driver power setting 1408. In some examples, the first bitline driver power setting 1402 is a 25% bitline power setting associated with a first bitline driver control code (e.g., BL_DRIVEN='00'). In some examples, the second bitline driver power setting 1404 is a 50% bitline power setting associated with a second bitline driver control code (e.g., BL_DRIVEN='01'). In some examples, the third bitline driver power setting 1406 is a 75% bitline power setting associated with a third bitline driver control code (e.g., BL_DRIVEN='10'). In some examples, the fourth bitline driver power setting 1408 is a 100% bitline power setting associated with a fourth bitline driver control code (e.g., BL_DRIVEN='11'). In some examples, registers are used to store and provide bitline driver control codes to provide a bitline voltage setting that is 25%, 50%, 75%, or 100% of the original bitline voltage drive strength.

Figure 14B:
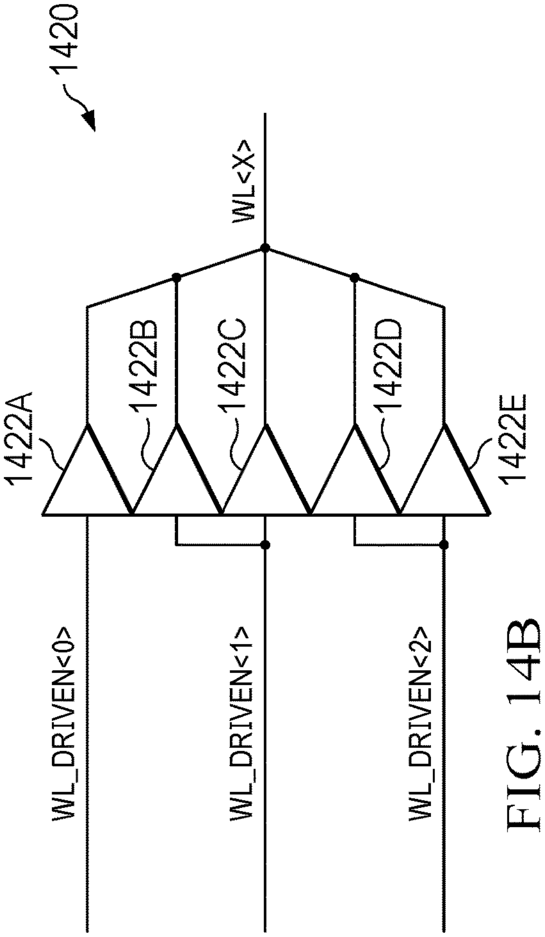
FIG. 14B is a diagram of wordline driver circuitry for a light modulator in accordance with various examples.

FIG. 14B is a diagram of wordline driver circuitry 1420 for a light modulator in accordance with various examples. In some examples, the wordline driver circuitry 1420 is an example of the adjustable wordline drivers 314 in FIG. 3. As shown, the wordline driver circuitry 1420 includes drivers 1422A to 1422E. Each of the drivers 1422A to 1422E has a respective input and a respective output. The input of the driver 1422A receives a first wordline control code (WL_DRIVEN<0>). The inputs of the drivers 1422B and 1422C are coupled to each other and receive a second wordline control code (WL_DRIVEN<1>). The inputs of the drivers 1422D and 1422E are coupled to each other and receive a third wordline control code (WL_DRIVEN<2>). The outputs of the drivers 1422A to 1422E are coupled to each other and provide a wordline voltage result (WL<X>). Based on the first, second, and third wordline control codes, the wordline voltage result from the wordline driver circuitry 1420 is adjustable. In the example of FIG. 14B, the wordline control codes are stored by registers and may be used individually or in combination to turn on 20%, 40%, and 40% of the wordline drivers respectively. The control codes may be used in any combination to drive the wordline voltage by 20%, 40%, 60%, 80%, or 100% of the default driver strength. In some examples, if WL_DRIVEN<0>=1, WL_DRIVEN<1>=0, and WL_DRIVEN<2>=0, WL<X> is set to 20% of the default driver strength. If WL_DRIVEN<0>=0, WL_DRIVEN<1>=1, and WL_DRIVEN<2>=0, WL<X> is set to 40% of the default driver strength. If WL_DRIVEN<0>=1, WL_DRIVEN<1>=1, and WL_DRIVEN<2>=0, WL<X> is set to 60% of the default driver strength. If WL_DRIVEN<0>=0, WL_DRIVEN<1>=1, and WL_DRIVEN<2>=1, WL<X> is set to 80% of the default driver strength. If WL_DRIVEN<0>=1, WL_DRIVEN<1>=1, and WL_DRIVEN<2>=1, WL<X> is set to 100% of the default driver strength.

Figure 15:
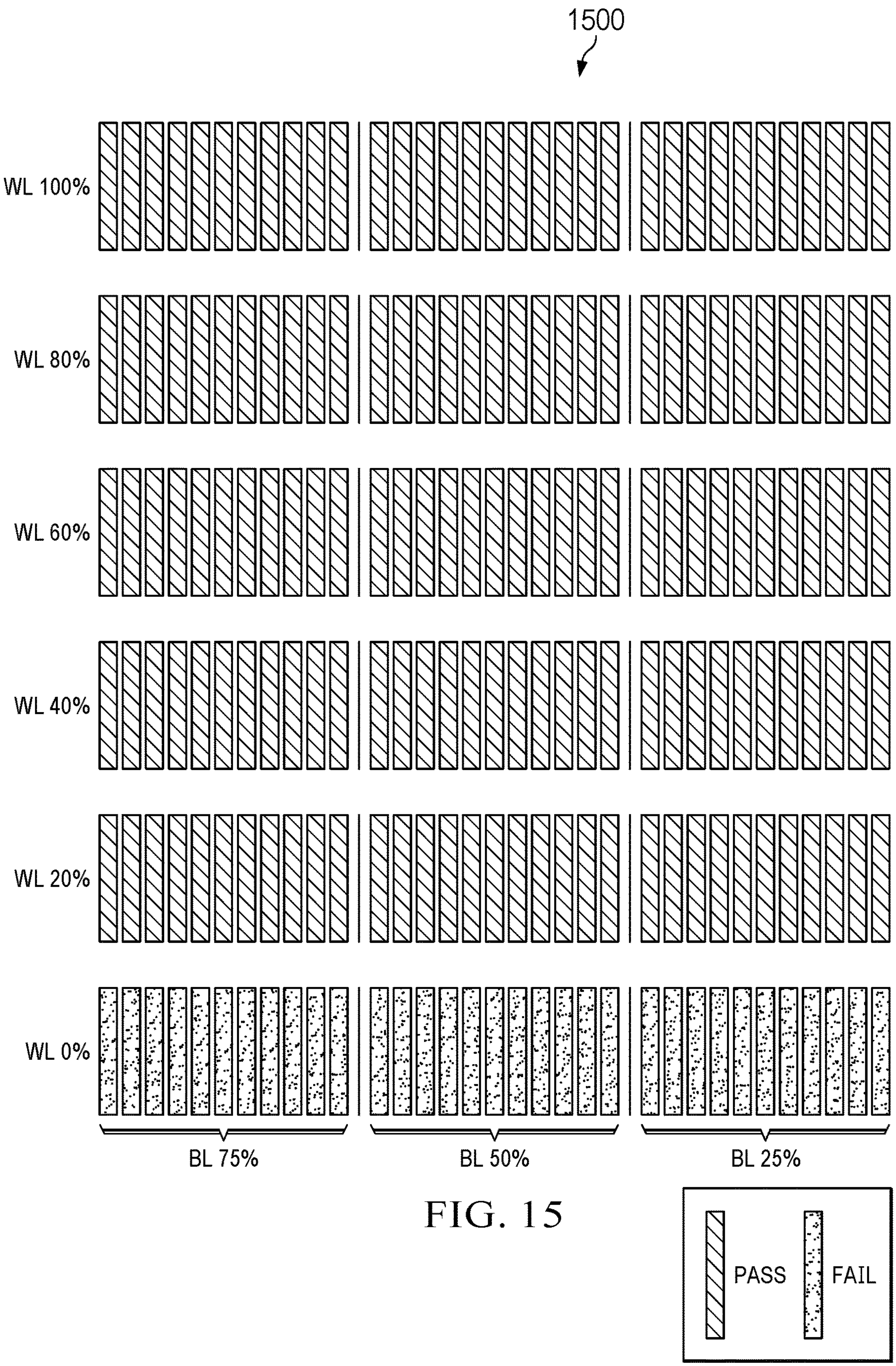
FIG. 15 is a diagram of wordline and bitline power test results for a light modulator in accordance with various examples.

FIG. 15 is a diagram 1500 of wordline and bitline power test results for a light modulator in accordance with various examples. In the example of FIG. 15, the wordline power settings include a 0% power setting, a 20% power setting, a 40% power setting, a 60% power setting, an 80% power setting, and a 100% power setting relative to a default driver strength. Meanwhile, bitline power settings include a 25% power setting, a 50% power setting, and a 75% power setting. In the example of FIG. 15, only the wordline power setting of 0% results in failure of light modulator operations. With wordline power settings of 20%, 40%, 60%, 80%, and 100%, and with bitline power settings of 25%, 50%, or 75%, a light modulator may still function. Accordingly, use of a lower setting for wordline power and/or bitline power is one way to reduce power consumption of light modulator control operations and a related display system. In some examples, the test results of diagram 1500 may be used to control adjustable wordline drivers and/or adjustable bitline drivers. As another option, the test results of diagram 1500 may be used to optimize wordline driver design and/or optimize bitline driver design for a light modulator. For different sizes or types of light modulators, such test results and resulting adjustment/optimization may vary.

In some examples, a light modulator and related controller implement nested layers of sleep modes. The nested sleep modes allow a controller and/or light modulator to go into a deepest power down state in which light module higher speed receiver circuitry is turned off based on a higher speed interface command. In some examples, a light modulator and related controller implement a light sleep mode in which a higher speed clock of the controller and/or the light modulator is gated off. In some examples, a light modulator and related controller implement a medium sleep mode in which higher speed receiver circuitry of the light modulator is turned off. In different scenarios, the higher speed clock buffer of a light modulator may be turned on or off during the medium sleep mode based on a setting. In some examples, the wake up time of higher speed receiver circuitry of a light modulator for the medium sleep mode is improved by 10×. Accordingly, the medium sleep mode may be used more often and/or may be used for a longer duration which reduces power consumption. In some examples, a light modulator and related controller implement a deep sleep mode. For the deep sleep mode, optimized/programmable power down of additional components compared to the medium sleep mode is performed. In some examples, a light modulator reduces power consumption of voltage regulation circuitry during illumination off intervals while improving operation space. In some examples, the number of voltage regulation circuits (e.g., VMIDN generators) are minimized and each voltage regulation circuit uses robust current mirroring. In some examples, a light modulator and related controller implement lower speed clock gating control. In some examples, a lower speed sleep mode is based on a controller starting and stopping the lower speed clock during periods of no activity while following a set of rules to ensure operations from the controller to the light modulator are completed. In some examples, lower speed clock gating management is based on detecting idle times between commands (e.g., reset commands to the light modulator) and gating a lower speed clock responsive to determine the idle time. In some examples, lower speed clock gating management is based on programmability in the number of "wake up" clock periods used (when exiting a sleep mode) prior to sending out a command after gating the lower speed clock. In some examples, lower speed clock gating management is based on programmability in the number of post-command clocks issued to allow the light modulator to complete its processing of a command. In some examples, lower speed clock gating management is based on command type and a number of post-command clocks for each command type. In some examples, the power supply for logic gates of a light modulator may be optimized to reduce power consumption while maintaining functionality. In combination, the example power reduction techniques described herein reduce power consumption of a light modulator by 35% or more, which facilitates ultra low power applications such as AR or VR.

In some examples, a controller (e.g., the controllers 104 in FIG. 1A, the optical engine 134 in FIG. 1B, the illumination module 142 in FIG. 1C, the controller 162 in FIG. 1D, the controller 270 in FIG. 2A, or the controller 270A in FIG. 2B) includes: a processor (e.g., processor 220 in FIG. 2A); and interface circuitry (e.g., the higher speed interface circuitry 230 in FIG. 2) for multiple interfaces. The interface circuitry is coupled to the processor and is configured to: receive load sequences (e.g., the image data transfers and idle times in FIG. 10) from the processor, the load sequences including a respective load sequence for each of the multiple interfaces (e.g., interface DMD_HS_SD0_P/N to DMD_HS_SDn_P/N in FIG. 2B), each load sequence including image data intervals and idle intervals; determine a duration for each of the idle intervals; and separately control a sleep mode for each of the multiple interfaces responsive to each of the idle intervals.

In some examples, the interface circuitry is configured to: determine if a duration of an idle interval of the idle intervals is less than a first threshold; and responsive to the duration of the idle interval being less than a first threshold, control a respective interface of the multiple interfaces to be in a light sleep mode that gates a respective clock signal. In such examples, the idle interval is a first idle interval and the interface circuitry is configured to: determine if a duration of a second idle interval of the idle intervals is more than the first threshold and less than a second threshold; and responsive to the duration of the second idle interval being more than the first threshold and less than the second threshold, control the respective interface of the multiple interfaces to be in a medium sleep mode that turns off a first set of interface components. In such examples, the interface circuitry is configured to: enter the light sleep mode before entering the medium sleep mode; and enter the light sleep mode upon exiting the medium sleep mode.

In some examples, the interface circuitry is configured to: determine if a duration of a third idle interval of the idle intervals is more than the second threshold; and responsive to the duration of the third idle interval being more than the second threshold, control the respective interface of the multiple interfaces to be in a deep sleep mode that turns off a second set of interface components separate from the first set of interface components. In such examples, the respective interface enters the light sleep mode and then medium sleep mode before entering the deep sleep mode, and the respective interface enters the medium sleep mode and then the light sleep mode upon exiting the deep sleep mode.

In some examples, the interface circuitry is first interface circuitry, the controller includes second interface circuitry for a second speed interface, the multiple interfaces use a first clock rate, the second speed interface uses a second clock rate that is less than the first clock rate. In such examples, the second interface circuitry is configured to: receive a control sequence from the processor, the control sequence including control operation intervals and idle intervals; and gate a clock for the second speed interface during idle intervals of the control sequence. In some examples, the control sequence includes mode control operations, configuration operations, reset operations, and idle intervals between the mode control operations, the configuration operations, and the reset operations. In such examples, the second interface circuitry is configured to: determine a duration for each of the idle intervals of the control sequence; and gate the clock for the second speed interface during each idle interval of the control sequence that is longer than a threshold.

In some examples, a projector includes: a light modulator having first speed interface circuitry and second speed interface circuitry, wherein the first speed is higher than the second speed; and a controller having first speed interface circuitry and second speed interface circuitry. The first speed interface circuitry of the light modulator is coupled to the first speed interface circuitry of the controller to provide multiple first speed interfaces. The second speed interface circuitry of the light modulator is coupled to the second speed interface circuitry of the controller to provide a second speed interface. In such examples, the controller is configured to: obtain a control sequence for the light modulator, the control sequence including control operation intervals and idle intervals; and gate a clock for the second speed interface during idle intervals of the control sequence.

In some examples, the control sequence includes mode control operations, configuration operations, and reset operations, and idle intervals between the mode control operations, the configuration operations, and the reset operations. In such examples, the second speed interface circuitry is configured to: determine a duration for each of the idle intervals of the control sequence; and gate the clock for the second speed interface during each idle interval of the control sequence that is longer than a threshold. In some examples, the controller is configured to adjust a number of clock cycles between wake up and sending out a command after a respective idle interval. In some examples, the controller is configured to adjust a number of clock cycles for the light modulator to complete processing of a command included with the control sequence before gating the clock for the second speed interface. In some examples, the controller is configured to adjust the number of clock cycles for the light modulator to complete processing of the command based on a command type.

In some examples, the controller is configured to: obtain load sequences, the load sequences including a respective load sequence for each of the multiple first speed interfaces, each load sequence including image data intervals and idle intervals determine a duration for each of the idle intervals of each load sequence; and separately control a sleep mode for each of the multiple first speed interfaces responsive to respective load sequences and respective idle intervals. In such examples, the sleep mode is one of a light sleep mode, a medium sleep mode, and a deep sleep mode, and the controller is configured to: gate a clock for a respective first speed interface of the multiple first speed interfaces in the light sleep mode; turn off a first set of circuitry for a respective first speed interface of the multiple first speed interfaces in the medium sleep mode; and turn off a second set of circuitry for a respective first speed interface of the multiple first speed interfaces in the deep sleep mode, the second set of circuitry separate from the first set of circuitry.

In some examples, the controller is configured to: control a respective first speed interface of the multiple first speed interfaces to enter the light sleep mode before entering the medium sleep mode; control a respective first speed interface of the multiple first speed interfaces to enter the light sleep mode upon exiting the medium sleep mode; control a respective first speed interface of the multiple first speed interfaces to enter the light sleep mode and then the medium sleep mode before entering the deep sleep mode; and control a respective first speed interface of the multiple first speed interfaces to enter the medium sleep mode and then the light sleep mode upon exiting the deep sleep mode. In some examples, the light modulator includes adjustable bitline drivers (e.g., the adjustable bitline drivers 306 in FIG. 3) and adjustable wordline drivers (e.g., the adjustable wordline drivers 314 in FIG. 3. In some examples, the light modulator includes adjustable reset control circuitry (e.g., the adjustable reset control circuitry 312 in FIG. 3).

In some examples, a light modulator (e.g., the light modulator 116 in FIG. 1, a light modulator of the optical engine 134 in FIG. 1B, the SLM 148 in FIG. 1C, the microLED or microOLED elements 164 in FIG. 1D, the light modulator 250 in FIG. 2A, the light modulator 250A in FIG. 2B, or the light modulator 300 in FIG. 3) includes a communication interface; adjustable control circuitry coupled to the communication interface; and an array of pixels coupled to the adjustable control circuitry. The adjustable control circuitry is configured to selectively adjust voltage levels for the array of pixels based on a target power consumption setting. In different examples, the target power consumption setting may be based on a light modulator size, a light modulator type, test results, and/or other parameters.

In some examples, the adjustable control circuitry includes: adjustable bitline drivers; adjustable wordline drivers; and adjustable reset control circuitry. In some examples, the adjustable reset control circuitry is configured to: adjust a first voltage between a first set of voltage levels including a bias voltage level, an offset voltage level, and an adjustable reset voltage level; and adjust a second voltage between a set of voltage levels including the offset voltage level.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

The invention claimed is:

1. A controller comprising:
- a processor; and
- interface circuitry for multiple interfaces, the interface circuitry coupled to the processor and configured to:
  - receive load sequences from the processor, the load sequences including a respective load sequence for each of the multiple interfaces, each load sequence including image data intervals and idle intervals;
  - determine a duration for each of the idle intervals; and
  - separately control a sleep mode for each of the multiple interfaces responsive to the idle intervals for the respective interface.

2. The controller of claim 1, wherein the interface circuitry is configured to:
- determine if a duration of an idle interval of the idle intervals is less than a first threshold; and
- responsive to the duration of the idle interval being less than a first threshold, control a respective interface of the multiple interfaces to be in a light sleep mode that gates a respective clock signal.

3. The controller of claim 2, wherein the idle interval is a first idle interval and the interface circuitry is configured to:
- determine if a duration of a second idle interval of the idle intervals is more than the first threshold and less than a second threshold; and
- responsive to the duration of the second idle interval being more than the first threshold and less than the second threshold, control the respective interface of the multiple interfaces to be in a medium sleep mode that turns off a first set of interface components.

4. The controller of claim 3, wherein the interface circuitry is configured to:
- enter the light sleep mode before entering the medium sleep mode; and
- enter the light sleep mode upon exiting the medium sleep mode.

5. The controller of claim 3, wherein the interface circuitry is configured to:
- determine if a duration of a third idle interval of the idle intervals is more than the second threshold; and
- responsive to the duration of the third idle interval being more than the second threshold, control the respective interface of the multiple interfaces to be in a deep sleep mode that turns off a second set of interface components separate from the first set of interface components,
- wherein the respective interface enters the light sleep mode and then medium sleep mode before entering the deep sleep mode, and
- wherein the respective interface enters the medium sleep mode and then the light sleep mode upon exiting the deep sleep mode.

6. The controller of claim 1, wherein the interface circuitry is first interface circuitry, the controller comprises second interface circuitry for a second speed interface, the multiple interfaces using a first clock rate, the second speed interface using a second clock rate that is less than the first clock rate, and the second interface circuitry configured to:
- receive a control sequence from the processor, the control sequence including control operation intervals and idle intervals; and
- gate a clock for the second speed interface during idle intervals of the control sequence.

7. The controller of claim 6, wherein the control sequence includes mode control operations, configuration operations, reset operations, and idle intervals between the mode control operations, the configuration operations, and the reset operations, and the second interface circuitry is configured to:

determine a duration for each of the idle intervals of the control sequence; and gate the clock for the second speed interface during each idle interval of the control sequence that is longer than a threshold.

8. A projector comprising:

a light modulator having first speed interface circuitry and second speed interface circuitry, wherein the first speed is higher than the second speed; and a controller having first speed interface circuitry and second speed interface circuitry, the first speed interface circuitry of the light modulator coupled to the first speed interface circuitry of the controller to provide multiple first speed interfaces, the second speed interface circuitry of the light modulator coupled to the second speed interface circuitry of the controller to provide a second speed interface, and the controller is configured to:

obtain a control sequence for the light modulator, the control sequence including control operation intervals and idle intervals; and gate a clock for the second speed interface during idle intervals of the control sequence.

9. The projector of claim 8, wherein the control sequence includes mode control operations, configuration operations, and reset operations, and idle intervals between the mode control operations, the configuration operations, and the reset operations, and the second speed interface circuitry is configured to:

determine a duration for each of the idle intervals of the control sequence; and gate the clock for the second speed interface during each idle interval of the control sequence that is longer than a threshold.

10. The projector of claim 8, wherein the controller is configured to adjust a number of clock cycles between wake up and sending out a command after a respective idle interval.

11. The projector of claim 8, wherein the controller is configured to adjust a number of clock cycles for the light modulator to complete processing of a command included with the control sequence before gating the clock for the second speed interface.

12. The projector of claim 11, wherein the controller is configured to adjust the number of clock cycles for the light modulator to complete processing of the command based on a command type.

13. The projector of claim 8, wherein the controller is configured to:

obtain load sequences, the load sequences including a respective load sequence for each of the multiple first speed interfaces, each load sequence including image data intervals and idle intervals;

determine a duration for each of the idle intervals of each load sequence; and separately control a sleep mode for each of the multiple first speed interfaces responsive to respective load sequences and respective idle intervals.

14. The projector of claim 13, wherein the sleep mode is one of a light sleep mode, a medium sleep mode, and a deep sleep mode, and the controller is configured to:

gate a clock for a respective first speed interface of the multiple first speed interfaces in the light sleep mode;

turn off a first set of circuitry for a respective first speed interface of the multiple first speed interfaces in the medium sleep mode; and turn off a second set of circuitry for a respective first speed interface of the multiple first speed interfaces in the deep sleep mode, the second set of circuitry separate from the first set of circuitry.

15. The projector of claim 14, wherein the controller is configured to:

control a respective first speed interface of the multiple first speed interfaces to enter the light sleep mode before entering the medium sleep mode;

control a respective first speed interface of the multiple first speed interfaces to enter the light sleep mode upon exiting the medium sleep mode;

control a respective first speed interface of the multiple first speed interfaces to enter the light sleep mode and then the medium sleep mode before entering the deep sleep mode; and control a respective first speed interface of the multiple first speed interfaces to enter the medium sleep mode and then the light sleep mode upon exiting the deep sleep mode.

16. The projector of claim 8, wherein the light modulator includes adjustable bitline drivers and adjustable wordline drivers.

17. The projector of claim 16, wherein the light modulator includes adjustable reset control circuitry.

* * * * *